(12) United States Patent
Dailly et al.

(10) Patent No.: US 7,537,682 B2
(45) Date of Patent: May 26, 2009

(54) METHODS FOR PURIFYING CARBON MATERIALS

(75) Inventors: Anne Dailly, Pasadena, CA (US);
Channing Ahn, Pasadena, CA (US);
Rachid Yazami, Los Angeles, CA (US);
Brent T. Fultz, Pasadena, CA (US)

(73) Assignees: California Institute of Technology, Pasadena, CA (US); Centre National de la Recherche Scientifique, Paris (FR)

( * ) Notice: Subject to any disclaimer, the term of this patent is extended or adjusted under 35 U.S.C. 154(b) by 703 days.

(21) Appl. No.: 11/081,841

(22) Filed: Mar. 16, 2005

(65) Prior Publication Data
US 2005/0205847 A1  Sep. 22, 2005

Related U.S. Application Data

(60) Provisional application No. 60/553,930, filed on Mar. 17, 2004.

(51) Int. Cl.
*C01B 31/02* (2006.01)
(52) U.S. Cl. .................. 205/555; 423/460; 423/461
(58) Field of Classification Search ............. 205/555; 423/460, 461
See application file for complete search history.

(56) References Cited

U.S. PATENT DOCUMENTS

| | | | |
|---|---|---|---|
| 3,536,532 A | 10/1970 | Watanabe et al. | |
| 3,700,502 A | 10/1972 | Wantanabe et al. | |
| 3,796,604 A | 3/1974 | Gabano et al. | |
| 3,796,605 A | 3/1974 | Dechenaux et al. | |
| 3,956,018 A | 5/1976 | Kozawa | |
| 3,969,489 A * | 7/1976 | Wu | 423/446 |
| 4,052,539 A | 10/1977 | Shropshire et al. | |
| 4,119,655 A | 10/1978 | Hulme | |
| 4,247,608 A | 1/1981 | Watanabe et al. | |
| 4,431,567 A | 2/1984 | Gestaut et al. | |
| 4,438,086 A | 3/1984 | Aramaki et al. | |
| 4,753,786 A | 6/1988 | Watanabe et al. | |
| 4,830,938 A | 5/1989 | McCullough et al. | |
| 4,840,859 A | 6/1989 | Williams et al. | |
| 4,865,931 A | 9/1989 | McCullough et al. | |
| 5,114,811 A | 5/1992 | Ebel et al. | |
| 5,116,592 A | 5/1992 | Weinberg | |
| 5,151,162 A | 9/1992 | Muller et al. | |
| 5,175,066 A | 12/1992 | Hamwi et al. | |
| 5,443,930 A | 8/1995 | Shoji et al. | |
| 5,518,836 A | 5/1996 | McCullough | |
| 5,532,083 A | 7/1996 | McCullough | |
| 5,534,370 A | 7/1996 | Kita et al. | |
| 5,695,734 A * | 12/1997 | Ikazaki et al. | 423/461 |
| 5,702,844 A | 12/1997 | Bernard et al. | |
| 5,705,689 A | 1/1998 | Lee et al. | |
| 5,712,062 A | 1/1998 | Yamana et al. | |
| 5,916,642 A | 6/1999 | Chang | |
| 5,968,683 A | 10/1999 | Kolb | |
| 6,022,643 A | 2/2000 | Lee et al. | |
| 6,068,921 A | 5/2000 | Yamana et al. | |
| 6,077,624 A | 6/2000 | Mitchell et al. | |
| 6,090,363 A * | 7/2000 | Green et al. | 423/447.1 |
| 6,100,324 A | 8/2000 | Choi et al. | |
| 6,120,941 A | 9/2000 | Lee et al. | |
| 6,203,814 B1 | 3/2001 | Fisher et al. | |
| 6,245,465 B1 | 6/2001 | Angell et al. | |
| 6,268,430 B1 | 7/2001 | Choi et al. | |
| 6,306,540 B1 | 10/2001 | Hiroi et al. | |
| 6,334,939 B1 | 1/2002 | Zhou et al. | |
| 6,352,798 B1 | 3/2002 | Lee et al. | |
| 6,358,649 B1 | 3/2002 | Yazami et al. | |
| 6,479,192 B1 | 11/2002 | Chung et al. | |
| 6,482,550 B1 | 11/2002 | Imachi et al. | |
| 6,489,055 B1 | 12/2002 | Ichihashi et al. | |
| 6,528,208 B1 | 3/2003 | Thackeray et al. | |
| 6,586,133 B1 | 7/2003 | Teeters et al. | |
| 6,589,299 B2 | 7/2003 | Missling et al. | |
| 6,638,662 B2 | 10/2003 | Kaneda et al. | |
| 6,649,033 B2 | 11/2003 | Yagi et al. | |

(Continued)

FOREIGN PATENT DOCUMENTS

EP  0 776 053  5/1997

(Continued)

OTHER PUBLICATIONS

Audier et al. (1981) "Crystallographic Orientations of Catalytic Particles in Filamentous Carbon; Case of Simple Conical Particles," *J. Cryst. Growth* 55:549-556.

(Continued)

*Primary Examiner*—Stuart Hendrickson
(74) *Attorney, Agent, or Firm*—Greenlee, Winner & Sullivan, P.C.

(57) ABSTRACT

Methods of purifying samples are provided that are capable of removing carbonaceous and noncarbonaceous impurities from a sample containing a carbon material having a selected structure. Purification methods are provided for removing residual metal catalyst particles enclosed in multilayer carbonaceous impurities in samples generate by catalytic synthesis methods. Purification methods are provided wherein carbonaceous impurities in a sample are at least partially exfoliated, thereby facilitating subsequent removal of carbonaceous and noncarbonaceous impurities from the sample. Methods of purifying carbon nanotube-containing samples are provided wherein an intercalant is added to the sample and subsequently reacted with an exfoliation initiator to achieve exfoliation of carbonaceous impurities.

23 Claims, 12 Drawing Sheets

U.S. PATENT DOCUMENTS

| | | |
|---|---|---|
| 6,709,566 B2 | 3/2004 | Cumings et al. |
| 6,713,214 B2 | 3/2004 | Koga et al. |
| 6,743,547 B2 | 6/2004 | Gan et al. |
| 6,743,549 B1 | 6/2004 | Doyle et al. |
| 6,767,671 B2 | 7/2004 | Itagaki et al. |
| 6,841,610 B2 | 1/2005 | Yanagisawa et al. |
| 6,844,115 B2 | 1/2005 | Gan et al. |
| 6,852,446 B2 | 2/2005 | Barbarich |
| 6,852,449 B2 | 2/2005 | Nagata et al. |
| 6,926,991 B2 | 8/2005 | Gan et al. |
| 6,939,383 B2 | 9/2005 | Eastin et al. |
| 6,958,198 B2 | 10/2005 | Iwamoto et al. |
| 6,986,967 B1 | 1/2006 | Barton et al. |
| 7,005,211 B2 | 2/2006 | Kim et al. |
| 7,074,523 B2 | 7/2006 | Arai et al. |
| 7,087,348 B2 | 8/2006 | Holman et al. |
| 2002/0119371 A1 | 8/2002 | Haug et al. |
| 2002/0127171 A1 | 9/2002 | Smalley et al. |
| 2002/0177041 A1 | 11/2002 | Wohrle et al. |
| 2002/0182506 A1 | 12/2002 | Cagle |
| 2003/0003370 A1 | 1/2003 | Arai et al. |
| 2003/0049535 A1 | 3/2003 | Ohta et al. |
| 2003/0108799 A1 | 6/2003 | Lascaud et al. |
| 2003/0158310 A1 | 8/2003 | Asano et al. |
| 2003/0224168 A1 | 12/2003 | Mack et al. |
| 2004/0013814 A1 | 1/2004 | Guerfi et al. |
| 2004/0048160 A1 | 3/2004 | Omaru |
| 2004/0058247 A1 | 3/2004 | Omaru |
| 2004/0091783 A1 | 5/2004 | Cagle |
| 2004/0106047 A1 | 6/2004 | Mie et al. |
| 2004/0131859 A1 | 7/2004 | Yerushalmi-Rozen et al. |
| 2004/0258986 A1 | 12/2004 | Shen et al. |
| 2005/0006623 A1 | 1/2005 | Wong et al. |
| 2005/0011710 A1 | 1/2005 | Hitchcock et al. |
| 2005/0026044 A1 | 2/2005 | Koike et al. |
| 2005/0069778 A1 | 3/2005 | Bonnett et al. |
| 2005/0118512 A1 | 6/2005 | Onuki et al. |
| 2005/0123835 A1 | 6/2005 | Sun |
| 2005/0170251 A1 | 8/2005 | Jung et al. |
| 2005/0207966 A1 | 9/2005 | Zaghib |
| 2005/0227146 A1 | 10/2005 | Ghantous et al. |
| 2006/0269834 A1 | 11/2006 | West et al. |
| 2007/0037063 A1 | 2/2007 | Choi et al. |

FOREIGN PATENT DOCUMENTS

| | | |
|---|---|---|
| EP | 1 019 975 | 7/2000 |
| EP | 1 028 476 | 8/2000 |
| EP | 1 205 003 | 5/2002 |
| EP | 1 230 708 | 8/2002 |
| EP | 1 236 239 | 9/2002 |
| EP | 1 520 318 | 4/2005 |
| EP | 1 551 069 | 7/2005 |
| FR | 2856674 | 12/2004 |
| JP | 11214037 | 8/1999 |
| JP | 2000106188 | 4/2000 |
| JP | 2000200604 | 7/2000 |
| JP | 2003187799 | 7/2003 |
| JP | 2005113361 | 4/2005 |
| JP | 2005285440 | 10/2005 |
| SU | 584369 | 12/1977 |
| WO | WO 97/02580 | 1/1997 |
| WO | WO 99/34470 | 7/1999 |
| WO | WO 01/94260 | 12/2001 |
| WO | WO 02/03430 | 1/2002 |
| WO | WO 03/004410 | 1/2003 |
| WO | WO 03/031050 | 4/2003 |
| WO | WO 03/040446 | 5/2003 |
| WO | WO 2004/051784 | 6/2004 |
| WO | WO 2004/088769 | 10/2004 |
| WO | WO 2004/090921 | 10/2004 |
| WO | WO 2004/096704 | 11/2004 |

OTHER PUBLICATIONS

Banerjee et al. (2003) "Rational Chemical Strategies for Carbon Nanotube Functionalization," *Chem. Eur. J.* 9:1898-1908.

Bethune et al. (1993) Cobalt-Catalyzed Growth of Carbon Nanotubes with Single-Atomic0Layer Walls, *Nature* 363:605-607.

Cassell et al. (1999) "Large Scale CVD Synthesis of Single-Walled Carbon Nanotubes," *J. Phys. Chem. B* 103(31):6484-6492.

Cheng et al. (1998) "Large-Scale and Low-Cost Synthesis of Single-Walled Carbon Nanotubes by the Catalytic Pyrolysis of Hydrocarbons," *Appl. Phys. Lett.* 72(25):3282-3284.

Chiang et al. (2001) Purification and Characterization of Single-Walled Carbon Nanotubes (SWNTs) Obtained from the Gas-Phase Decomposition of CO (HiPco Process) *J. Phys. Chem. B* 105:8297-8301.

De Jong et al. (2000) "Carbon Nanofibers: Catalytic Synthesis and Applications," *Catalysis Reviews-Science and Engineering* 42:481-510.

Dresselhaus et al. (1981) "Intercalation Compounds of Graphite," *Adv. Phys.* 30(2):139-326.

Duclaux, L. (2002) "Review of the Doping of Carbon Nanotubes (Multiwalled and Single-Walled)," *Carbon* 40:1751-1764.

Duesberg et al. (1998) "Chromatographic Size Separation of Single-Wall Carbon Nanotubes," *Appl. Phys. A* 67:117-119.

Feng et al. (2003) "Removal of Some Impurities From Carbon Nanotubes," *Chem. Phys. Lett.* 375:645-648.

Furdin, G. (1998) "Exfoliation Process and Elaboration of New Carbonaceous Materials," *Fuel* 77(6):479-485.

Hafner et al. (1998) "Catalytic Growth of Single-Wall Carbon Nanotubes From Metal Particles," *Chem. Phys. Lett.* 296(1-2):195-202.

Harutyunyuan et al. (2002) "Purification of Single-Wall Carbon Nanotubes by Selective Microwave Heating of Catalyst Particles," *J. Phys. Chem. B* 106:8671-8675.

Holzinger et al. (2000) "A New Purification Method for Single-Wall Carbon Nanotubes (SWNTs)," *Appl. Phys. A* 70:599-602.

Iijima, S. (1991) "Helical Microtubules of Graphite Carbon," *Nature* 354:56-58.

Iijima et al. (1993) "Single-Shell Carbon Nanotunbes 1-nm Diameter," *Nature* 363:603-605.

Inagaki et al. (2004) "Exfoliation Process of Graphite Via Intercalation Compounds with Sulfuric Acid," *J. Phys. Chem. Solids* 65:133-137.

Inagaki et al. (1994) "Graphite Exfoliation at Room Temperature and its Structural Annealing," *Carbon* 32(7):1253-1257.

Journet et al. (1997) "Large-Scale Production of Single-Walled Carbon Nanotubes by the Electric-Arc Technique," *Nature* 388:756-758.

Kitiyanan et al. (2000) "Controlled Production of Single-Wall Carbon Nanotubes by Catalytic Decomposition of CO on Bimetallic Co—Mo Catalysts," *Chem. Phys. Lett.* 317(3-5):497-503.

Kovtyukhova et al. (2003) "Individual Single-Walled Nanotubes and Hydrogels Made by Oxidative Exfoliation of Carbon Nanotube Ropes," *J. Am. Chem. Soc.* 125:9761-9769.

Kuga et al. (1993) "Laser-Assisted Exfoliation of Potassium-Ammonia-Graphite Intercalation Compounds," *Carbon* 31(1):201-204.

Liu et al. (1998) "Fullerene Pipes," *Science* 280:1253-1256.

Magasinski et al. (2002) "Graphitization, Intercalation, and Exfoliation of Cokes and Anthracites: A Comparative Study," *Fuel Processing Technol.* 79(3):259-264.

Messaoudi et al. (1991) "Chemical-Reduction of $FeCl_3$-Graphite Intercalation Compounds with Potassium Naphalene Complex in Tetrahydrofuan," *J. Mater. Chem.* 1(5):735-738.

Nakamizo et al. (1974) "Laser Raman Studies on Carbons," *Carbon* 12:259-267.

Nemanich et al. (1977) Raman Scattering from Intercalated Donor Compounds of Graphite, *Phys. Rev. B* 16(6):2965-2972.

Petitjean et al. (1994) "Exothermic Exfoliation of Graphite-Intercalation Compounds Containing Perchloric-Acid," *Carbon* 32(3):461-467.

Rinzler et al. (1998) "Large-Scale Purification of Single-Wall Carbon Nanotubes: Process, Product, and Characterization," *Appl. Phys. A* 67:29-37.

Skowronski et al. (2004) "Electrochemical Intercalation of $ZnCl_2$-$CrO_3$-GIC (Graphite Intercalation Compound) with Sulfuric Acid," *Polish J. Chem.* 78:1339-1344.

Su et al. (2000) "A Scalable CVD Method for the Synthesis of Single-Walled Carbon Nanotubes with High Catalyst Productivity," *Chem. Phys. Lett.* 322(5):321-326.

Takahashi et al. (2004) "Dispersion and Purification of Single-Wall Carbon Nanotubes Using Carboxymethylcellulose," *Jap. J. Appl. Phys.* 43(6A):3636-3639.

Takenobu et al. (2003) "Hydrogen Storage in $C_{70}$ Encapsulated Single-Walled Carbon Nanotube," *Synthetic Metals* 135-136:787-788.

Thess et al. (1996) "Crystalline Ropes of Metallic Carbon Nanotubes," *Science* 273:483-487.

Toyoda et al. (2004) "Exfoliation of Carbon Fibers," *J. Phys. Chem. Solids* 65:109-117.

Tuinstra et al. (1970) "Raman Spectrum of Graphite," *J. Chem. Phys.* 53(3):1126-1130.

Yoshida et al. (1991) "Exfoliated Graphite from Various Intercalation Compounds," *Carbon* 29(8):1227-1231.

Zheng et al. (2002) "CVD Synthesis and Purification of Single-Walled Carbon Nanotubes on Aerogel-Supported Catalyst," *Appl. Phys. A* 74:345-348.

International Search Report Corresponding to PCT/US05/08897, Mailed Aug. 28, 2006.

Abidi et al. (2003) "Alkali Metal Ion Complexes of Functionalized Calizarenes—Competition Between Pendent Arm and Anion Bond to Sodium," *Org. Biomol. Chem.* 1:3144-3146.

Arnold et al. (1987) "Evidence for Cryptand-Like Behavior in Bibracchial Lariat Ether (BiBLE) Complexes Obtained from X-Ray Crystallography and Solution Thermodynamic Studies," *J. Am. Chem. Soc.* 109:3716-3721.

Arora et al. (2004) "Battery Separators," *Chem. Rev.*, 104:4419-4462.

Basire et al. (2000) "Evolution of the Lamellar Structure During Crystallization of a Semicrystalline-Amorphous Polymer Blend: Time-Resolved Hot-Stage SPM Study," *Phys. Rev. Lett.* 85:5587-5590.

Beer et al. (2003) "Transition Metal and Organometallic Anion Complexation Agents," *Coord. Chem. Rev.* 240:167-189.

Bertani et al. (1999) "$^{19}F/^{29}Si$ Distance Determination in Fluoride-Containing Octadecasil by Hartmann-Hahn Cross-Polarization Under Fast Magic-Angle Spinning," *Solid State Magn. Res.* 13:219-229.

Bitter et al. (1998) "Studies on Calix(aza)crowns, II. Synthesis of Novel Proximal Doubly Bridged Calix[4]arenes by Intramolecular Ring Closure of Syn 1,3- and 1,2- to ω-Chloroalkylamides," *Tetrahedron* 54:3857-3870.

Blesa et al. (2006) "Bis(calixcrown)tetrathiafuvalene Receptors," *Chem. Eur. J.* 12:1906-1914.

Blumberg, W.E. (1960) "Nuclear Spin Lattice Relaxation Caused by Paramagnetic Impurities," *Phys. Rev.* 119:79-84.

Bonnamy et al. (1999) "Carbonization of Various Precursors. Effect of Heating Rate: Part II: Transmission Electron Microscopy and Physicochemical Studies," *Carbon* 37:1707-1724.

Bonnamy et al. (1999) "Carbonization of Various Precursors. Effect of Heating Rate: Part I: Optical Microscopy Studies," *Carbon* 37:1691-1705.

Bourderau et al. (1999) "Amorphous Silicon as a Possile Anode Material for Li-ion Batteries," *J. Power Sources* 81:233-236.

Bruce, G. (2005) "Development of a CFx D Cell for Man Portable Applications," In; Joint Service Power Expo, Power Point Presentation.

Bulusheva et al. (2002) "Atomic Arrangement and Electronic Structure of Graphite Fluoride C2F," *Phys. Low-Dim. Struct.* 7/8:1-14.

Chamssedine et al. (2007) "Reactivity of Carbon Nanofibers with Fluorine Gas," *Chem. Mater.* 19:161-172.

Charlier et al. (1993) "First Principles Study of Graphite Monofluoride $(CF)_n$," *Phys. Rev. B*, 47:16162-16168.

Chevalier et al. (1994) "Anionic Intercalation in $La_2CuO_4$ Oxide by Fluorine or Chlorine Treatment," *Mol. Cryst. Liq. Cryst.* 244:135-142.

Chieu et al. (1982) "Raman Studies of Benzene-Derived Graphite Fibers," *Phys. Rev. B* 26:5867.

Chung et al. (1995) "Electrochemical Behavior of Calix[4]arenediquinones and Their Cation Binding Properties," *J. Electroanalytical Chem.* 396:431-439.

Dahn et al. (2000) "Energy and Capacity Projections for Practical Dual-Graphite Cells," *J. Electrochem. Soc.* 147(3):899-901.

Davidson (2003) "Lithium Batteries, Molecular Expressions, Electricity and Magnetism," Florida State Univ., http://micro.magnet.fsu.edu/electromag/electricity/batteries/lithium.html, Downloaded Dec. 15, 2005.

Derf et al. (2001) "Tetrathiafulvalene Crowns: Redox Switchable Ligands," *Chem. Eur. J.* 7(2):447-455.

Dietrich (1993) "Design of Anion Receptors: Applications," *Pure Apple. Chem.* 65(7):1457-1464.

Ding et al. (2001) "Change of Conductivity with Salt Content, Solvent Composition, and Temperature for Electrolytes of LiPF6 in Ethylene Carbonate-Ethyl Methyl Carbonate," *J. Electrochem. Soc.* 148(10):A1196-A1204.

Dubois et al. (2006) "EPR and Solid-State NMR Studies of Poly(dicarbon monofluoride) $(C_2F)_n$," *J. Phys. Chem. B.* 110:11800-11808.

Dubois et al. (2004) "NMR and EPR Studies of Room Temperature Highly Fluorinated Graphite Heat-Treated Under Fluorine Atmosphere," *Carbon* 42:1931-1940.

Duijvestjn et al. (1983) "$^{13}C$ NMR Spectroscopy in Diamonds Using Dynamic Nuclear Polarization," *Chem. Phys. Lett.* 102:25-28.

Ebert et al. (1974) "Carbon Monofluoride. Evidence for a Structure Containing an Infinite Array of Cyclohexane Boats," *J. Am. Chem Soc.*, 96:7841-7842.

Ehrlich, G.M. (2001) "Lithium-Ion Batteries," In; *Handbook of Batteries*, 3rd ed., Ch. 35, New York, McGraw Hill, pp. 35.1-35.90.

Endo, M. (1988) "Grow Carbon Fibers in the Varpor Phase," *Chemtech* :568-576.

Frank et al. (1975) "Preparation and Crystal-Structure of $Li_3SN_5$ and Structural Relations Between Phases of Systems Li-SN and Li-PB," *Z. Naturforsch. B* 30:316-322.

Fujimoto (1997) "Structure Analysis of Graphite Fluoride by Rietveld Method," *Carbon*, 35:1061-1065.

Giraudet et al. (2006) "Solid-State NMR Studies of Covalent Graphite Fluorides $(CF)_n$ and $(C_2F)_n$," *J. Phys. Chem. Solids* 67(5-6):1100-1105.

Giraudet et al. (2005) "Solid-State $^{19}F$ and $^{13}C$ NMR of Room Temperature Fluorinated Graphite and Samples Thermally Treated Under Fluorine: Low-Field and High-Resolution Studies," *J. Solid State Chem.* 118:1262-1268.

Giraudet et al. (2005) "Solid-State NMR ($^{19}F$ and $^{13}C$) Study of Graphite Monofluoride $(CF)_n$: 19F Spin;Lattice Magnetic Relaxation and 19F/13C Distance Determination by Hartmann-Hahn Cross Polarization," *J. Phys. Chem. B* 109:175-181.

Gladyshevskii et al. (1964) "New Examples of the Structural Type $Li_{22}Pb_5$," *Sov. Phys. Crystallogr.* 9(3):269-271.

Gokel et al. (2000) "Experimental Evidence for Alkali Metal Cation—π Interactions," *Eur. J. Chem.* :2967-2978.

Graetz et al. (2003) "Highly Reversible Lithium Storage in Nanostructured Silicon," *Electrochemical and Solid-State Letters*, 6(9) A194-A197.

Guerin et al. (2004) "Hybrid-Type Graphite Fluoride as Cathode Material in Promary Lithium Batteries," *Electrochem. Solid-State Lett.* 7(6):A159-A162.

Gupta et al. (2001) "Raman Scattering Study of Highly Fluorinated Graphite," *J. Fluorine Chem.*, 110:145-151.

Gupta et al. (2003) "A Study on the Formation Mechanism of Graphite Fluorides by Raman Spectroscopy," *J. Fluorine Chem.* 120:143-150.

Hagaman et al. (1998) "Solid-State $^{13}C$ and $^{19}F$ NMR Characterization of Fluorinated Charcoal," *Energy & Fuel* 12:399-408.

Hamwi et al. (1997) "Fluorination of Carbon Nanotubes," *Carbon* 35:723-728.

Hamwi et al. (1998) "Electrochemical Properties of Carbon Nanotube Fluorides in a Lithium Cell System," *Mol. Cryst. Liq. Cryst.* 310:185-190.

Hamwi, A. (1996) "Fluorine Reactivity with graphite and Fullerenes. Fluoride Derivatives and Some Practical Electrochemical Applications," *J. Phys. Chem. Solids* 57(6-8):677-688.

Hany et al. (1997) "Low-Temperature Carbon Fluoride for High Power Density Lithium Primary Batteries," *J. Power Sources* 68(2):708-710.

Harris, P. (1999) *Carbon Nanotubes and Related Structures*, Cambridge University Press, Cambridge, pp. 103.

Hopf et al. (1972) "Structure of the Lithium Germanide Phase $Li_7Ge_2$," *Z. Naturforsch. B* 22:1157-1160.

International Search Report Corresponding to International Application No. PCT/US07/62518, Mailed Sep. 27, 2007.

International Search Report Corresponding to International Application No. PCT/US05/37871, Mailed Apr. 19, 2006.

International Search Report corresponding to International Application No. PCT/US/03/28395, Mailed Feb. 8, 2005.

Jacobs (2005) Lithium Battery Basics, Machine Design, www.machinedesign.com/ASP/strArticleID/55501/strSite/MDSite/viewSelectedArt.asp.

Jacobs (2005) "Long-lasting Lithiums," *Electron. Comm Technol.*, http://dataweek/co.za/Article.ASP?pklArticleID=1847&pklIssueID=455.

Johansson, P. (2006) "Intrinsic Anion Oxidation Potentials," *J. Phys. Chem.* 110:12077-12080.

Johnson et al. (1965) "The Crystal Structure of $Li_{15}Ge_4$," *Acta. Cryst.* 18:131-132.

Kelly et al. (1999) "Insight into the Mechanicsm of Sidewall Functionalization of Single-Walled Nanotubes: An STM Study," *Chem. Phys. Lett.* 313:445-450.

Kita et al. (1979) "Chemical Composition and Crystal Structure of Graphite Fluoride," *J. Am. Chem. Soc.*, 101:3832-3841.

Knight et al. (1980) "Characterization of Diamond Films by Ranan Spectroscopy," *J. Mater Res.* 4:385-393.

Krawietz et al. (1998) "Characterization of Poly(carbon monofluoride) by 19F and 19F to 13C Cross Polarization MAS NMR Spectroscopy," *Chem. Commun.* 19:2151-2151.

Kuriakose et al. (1965) "Kinetics of Reactions of Elemental Fluorine. IV. Fluorination of Graphite," *J. Phys. Chem.* 69:2272-2274.

Lam et al. (Jun. 27, 2005) "Physical Characteristics and Rate Performance $(CF_x)_n$ (0.33<x<0.66) in Lithium Batteries," *J. Power Sci.* 153:354-359.

Lee et al. (2003) "The Physiochemical Characteristics of Modified Carbon Fibers by Fluorination," *Korean J. Chem. Eng.* 20(1):151-156.

Lee et al. (2004) "Synthesis of a Series of Fluorinated Boronate Compounds and Tehir Uses as Additives in Lithium Battery Electrolytes," *J. Electrochem. Soc.* 151(9):A1429-1435.

Lee et al. (Aug. 1998) "The Synthesis of a New Family of Boron-Based Anion Receptors and The Study of Their Effect on Ion Pair Dissociation and Conductivity of Lithium Salts in Nonaqueous Solutions," *J. Electrochem. Soc.* 145(8):2813-2818.

Li et al. (2000) "The Crystal Structural Evolution of Nano-Si Anode Caused by Lithium Insertion and Extraction at Room Temperature," *Solid State Ionics*, 135:181-191.

Li et al. (1999) "A High Capacity Nano-Si Composite Anode Material for Lithium Rechargeable Batteries," *Electrochemical and Solid-State Letters*, 2(11) 547-549.

Limthongkul et al. (2003) "Electorchemically-Driven Solid-State Amorphization in Lithium-Silicon Alloys and Implications for Lithium Storage," *Acta Materialia* 51:1103-1113.

Linden et al. (2001) "Lithium Batteries," In; *Handbook of Batteries*, 3rd ed., Ch. 14, New York, McGraw Hill, pp. 14.1-14.99.

Liu et al. (2005) "Versatile Self-Complexing Compounds Based on Covalently Linked Donoe-Acceptor Cyclophanes," *Chem. Eur. J.* 11:369-385.

Mark et al. (1986) "Electron-Transfer Polymers," In; *Encyclopedia of Polymer Science and Engineering*, 2nd ed., vol. 5, Wiley, pp. 725-755.

Menges et al. (1969) "Crystal Structure of Lithium Germanide, A New Type of Three-Dimensional Bonding of Element(IV) Atoms," *Z. Naturforsch. B* 24:1351-1352.

Mickelson et al. (1998) "Fluorination of Single-Wall Carbon Nanotubes," *Chem. Phys. Lett.* 296:188-194.

Mitkin et al. (2002) "X-ray Electron- and Auger-Spectroscopic Study of Superstoichiometric Fluorographite-Like Materials," *J. Struct. Chem.*, 43:843-855.

Mittkin et al. (2003) "Types of Inorganic Fluorocarbon Polymer Materials and Structure-+roperty Correlation Problems," *J. Struct. Chem.* 44:82-115 (Translated from *Zhurnal Structunoi Khimii* 44:99-138).

Mochida et al. (2000) "Chemistry of Synthesis, Structure, Preparation and Application of Aromatic-Derived Mesophase Pitch," *Carbon* 38:305-328.

Morita et al. (1980) "Evaluation of Cathode Materials for the Lithium/Carbonmonofluride Battery," *J. Power Sources* 5:111-125.

Nakajima et al. (1999) "Electrochemical Behavior of Surface-Fluorinated Graphite," *Electrochem. Acta*, 44:2879-2888.

Nakajima et al. (1991) "Synthesis and Structures of Graphite Fluorides," In; *Graphite Fluorides and Carbon-Fluorine Compounds*, CRC Press, Boca Raton, FL, Ch. 2, pp. 11-41.

Nakajima et al. (1991) "Lithium-Graphite Fluoride Battery," In; *Graphite Fluorides and Carbon-Fluorine Compounds*, CRC Press, Boca Raton, FL, Ch. 4, pp. 77-109.

Nakajima, T. (1995) "Synthesis, Structure, and Physicochemical Properties of Fluorine-Graphite Intercalation Compounds," In; *Fluorine-Carbon and Fluoride-Carbon Materials*, Marcel Dekker, New York, pp. 1-31.

Nanse et al. (1997) "Fluorination of Carbon Blacks: An X-Ray Photoelectron Spectroscopy Study: I. A literature Review of XPS Studies of Fluorinated Carbons. XPS investigation of some reference compounds," *Carbon*, 35:175-194.

Nasimbulin et al. (2005) "Synthesis of Nanoparticles Using Vapor-Phase Decomposition of Copper(II) Acetylacetonate," *Colloid J.* 67(1):1-20.

Nazri, M. (2004) "Liquid Electrolytes: Some Theoretical and Practical Aspects," In; *Lithium Batteries Science and Technology*, Ch. 17, Kluer Academic Publishers, pp. 509-573.

Nesper (1990) "Structure and Chemical Bonding in Zintl-Phases Containing Lithium," *Prog. Solid-State Chem.* 20:1-45.

Oberlin et al. (1989) "High-Resolution TEM Studies of Carbonization and Graphitization," *Chemistry and Physics of Carbon*, Thrower, P.A. ed., vol. 22, New York, Marcel Dekker, pp. 1-143.

Ohara et al. (2003) "Li Insertion/Extraction Reaction at a Si Film Evaporated on a Ni Foil," *Journal of Power Sources*, 119-121.

Okotrub et al. (2000) "Fluorinated Cage Multiwall Carbon Nanoparticles," *Chem. Phys. Lett.* 323:231-236.

Osswald et al. (2005) "Elimination of D-Band in Raman Spectra of Double-Wall Carbon Nanotubes by Oxidation," *Chem. Phys. Lett.* 402:422-427.

Panich A.M. (1999) "Nuclear Magnetic Resonance Study of Fluorine-Graphite Intercalation Compounds and Graphite Fluorides," *Synth. Matals* 100:169-185.

Panich et al. (2001) "On Paramagnetism in Fluorinated Graphite: EPR and Solid-State NMR Study," *J. Phys. Chem. Solids* 62:959-964.

Pelikan et al. (2003) "On the Structural and Electronic Properties of Poly(dicarbon monofluoride): Solid-State Semi-Empirical INDO Study," *J. Solid State Chem.*, 174:233-240.

Pilarzyk "Lithium Carbon Monofluoride Coin Cells in Real-Time Clock and Memory Backup Applications," *Rayovac, White Papers*, http://www.rayovac.com/technical/wp_lithium.htm.m Downloaded Oct. 17, 2005.

Piotrowski et al. (2001) "Self-Assembled Organometallic [12]Metallacrown-3 Complexes," *Chem. Eur. J.* 7(15):3197-3207.

Press et al. (1988) *Numerical Recipes in C, The Art of Scientific Computing*, Plenum Press, New York.

Rao et al. (1992) "Raman-Scattering and Transmission-Electron-Microscopy Studies of Fluorine-Intercalated Graphite Fibers CxF (7.8≧x≧2.9)," *Phys. Rev. B* 45:6883-6892.

Rudorf et al. (1947) "Zur Konstitution des Kohlenstoff-Monofluorides," *Z. Anorg. Allg. Chem.* 253:281-296.

Ruff et al. (1934) "Die Reaktionsprodukte der verschiedenen Kohlenstoffformen mit Fluor II (Kohlenstoff-monofluorid)," *Z. Anorg. Allg. Chem.* 217:1-18.

Sano et al. (2002) "Properties of Carbon Onions Produced by an Arc Discharge in Water," *J. Appl. Phys.* 92(5):2783-2788.

Sato et al. (2004) "On the So-Called 'Semi-Ionic' C-F Bond Character in Fluorine-GIC," *Carbon* 42:3243-3249.

Sayama et al. (2002) "New Active Material Structure in Si Thin Film Electrode for Rechargable Lithium Batteries," The 11$^{th}$ International Meeting on Lithium Batteries, Abstract 52, Monterey, CA, Jun. 23-28, 2002.

Seel et al. (2000) "Electrochemical Intercalation of $PF_6$ into Graphite," *J. Electrochem. Soc.* 147(3):892-898.

Shneyder "Two-Dimensional Oxidation of SiGe," 69-71, http://www.nnf.cornell.edu/1999REU/ra/Schneyder.pdf.

Shundrin et al. (2004) "The Electrochemical Oxidation of Polyfluorophenyltrifluoroborate Anions in Acetonitrile," *Z. Anorg. Allg. Chem.* 630:1253-1257.

Singh et al. (2006) "Study of Interactions of Various Ionic Species with Solvents Toward the Design of Receptors," *Theor. Chem. Acc.* 115:127-135.

Steed, J.W. (2001) "First- and Second Sphere Coordination Chemistry of Alkali Metal Crown Ether Complexes," *Coord. Chem. Rev.* 215:171-221.

Stein et al. (1987) "π-Electron Properties of Large Condensed Polyaromatic Hydrocarbons," *J. Am. Chem. Soc.* 109:3721-3729.

Sun et al. (2003) "The Compatibility of a Boron-Based Anion Receptor with the Carbon Anode in Lithium-Ion Batteries," *Electrochem. Solid-State Lett.* 6(2):A43-A46.

Sun et al. (1998) "A Novel Lithium Battery Electrolyte Based on Lithium Fluoride and a Tris(pentafluorophenyl) Borane Anion Receptor in DME," *Electrochem. Solid-State Lett.* 1(6):239-240.

Takai et al. (2000) "Fluorine-Introduced sp3-Carbon Sites in a Nano-Sized pi-Electron System and Their Effects on the Electronic Properties," *Mol. Cryst. Liq. Cryst.* 340:289-294.

Takamura et al. (2002) "Li Insertion/Extraction Reaction of a Si Film Evaporated on Ni Foil," The 11$^{th}$ International Meeting on Lithium Batteries, Abstract 257, Monterey, CA, Jun. 23-28, 2002.

Touhara et al. (1987) "On the Structure of Graphite Fluoride," *Anorg. All. Chem.*, 544:7-20.

Touhara et al. (2000) "Property Control of Carbon Materials by Fluorination," *Carbon* 38:241-267.

Touhara et al. (2002) "Property Control of New Forms of Carbon Materials by Fluorination," *J. Fluorine Chem.* 114:181-188.

Touhara et al. (1987) "Electrochemical Characteristics of Fluorine Intercalated Graphite Fiber-Lithium Cells," *Electrochemica Acta* 32(2):293-298.

Touhara et al. (2004) "Fluorination of Cup-Stacked Carbon Nanotubes, Structure and Properties," Materials Research Society Fall Meeting Proceedings, MRS Proceedings vol. 858E, Abstract No. HH12.3.

Ue et al. (2002) "Anodic Stability of Several Anions Examined by AB Initio Molecular Orbital and Density Functional Theories," *J. Electrochem. Soc.* 149(12):A1572-A1577.

Ue et al. (2006) "Electrochemical Properties of $Li[C_nF_{2n+1}BF_3]$ as Electrolyte Salts for Lithium-Ion Cells," *Solid State Ionics* 177:323-331.

Watanabe et al. (1988) "Graphite Intercalation Compound of Fluorine," In; *Graphite Fluorides,* Elsevier, Amsterdam, Ch. 8, pp. 240-261.

Wantanabe et al. (1988) "Lithium-Graphite Fluoride Battery," In; *Graphite Fluorides,* Elsevier, Amsterdam, Ch. 5, pp. 148-203.

Wantanabe et al. (1988) "Preparation, Stoichiometry and Structure of Graphite Fluoride," In; *Graphite Fluorides,* Elsevier, Amsterdam, Ch. 2, pp. 23-89.

Watanabe, N. (1981) "Characteristics and Applications of Graphite Fluoride," *Physica B* 105:17-21.

Whitacre et al. (Sep. 2006) "Low Operational Temperature Li-CFx Batteries Using Cathodes Containing Sub'Fluorinated GraphiteMaterials," *J. Power Sources* 160:577-584.

Whittingham (1975) "Mechanism of Reduction of Fluorographite Cathode," *J. Electrochem. Soc.,* 122:526-527.

Wilkie et al. (1979) "The Solid-State $^{13}$C-NMR and $^{19}$F-NMR Spectra of Some Graphite Fluorides," *J. Solid State Chem.* 30:197-201.

Winter et al. (2004) "Carbonaceous and Graphitic Anodes," In; *Lithium Batteries Science and Technology,* Ch. 5, Kluer Academic Publishers, pp. 144-194.

Woo et al. (2003) "Structural Characteristics of Carbon Nanorods and Nanotubes Grown Using Electron Cyclotron Resonance Chemical Vapor Deposition," *J. Appl. Phys.* 94(10):6789-6795.

Xu et al. (2004) "Nonqueous Liquid Electrolytes for Lithium-Based Rechargeable Batteries," *Chem. Rev.* 104:4303-4417.

Yang et al. (2002) "Characteristics and Carbonization Behaviors of Coal Extracts," *Fuel Processing Technol.* 70:207-215.

Yazami et al. (2006) "The Kinetics of Sub-Fluorinated Carbon Fluoride Cathods for Lithium Batteries," Meeting Abstracts, Electrochem Soc., 210$^{th}$ ECS Meeting, Oct. 29-Nov. 3, Cancun Mexico Abstract #235.

Yokomichi et al. (2000) "Temperature Dependence of Electron Spin Resonance in Fluorinated Amorphous Carbon Films," *J. Non-Cryst. Solids* 266:797-802.

Yokomichi et al. (1998) "Preparation of Fluorinated Amorphous Carbon Thin Films," *J. Non-Cryst. Solids* 227:641-644.

Zajac et al. (2000) "The Structure and Properties of Graphite Monofluoride Using the Three-Dimensional Cyclic Cluster Approach," *J. Solid State Chem.,* 150:286-293.

Zhao et al. (2005) "A Calixarene-Amide-tetrathiafulvalene Assembly for the Electrochemical Detection of Anions," *New J. Chem.* 29:1164-1167.

Zhou et al. (2005) "$Li[C_2F_5BF_3]$ as an Electrolyte Salt for 4 V Class Lithium-Ion Cells," *J. Electrochem. Soc.* 152(2):A351-A356.

Zhou et al. (1999) "Controlled Li Doping of Si Nanowires by Electrochemical Insertion Method," Applied Physics Letters, 75(16):2447-2449.

Author (Unknown), 2004, "Meeting the Energy Need of Future Warriors," *National Academic Press,* www.nap.edu/openbook/0309092612/html/91.html, Downloaded Oct. 14, 2005.

Author (Unknown), 2004, "Meeting the Energy Need of Future Warriors," National Academic Press, www.nap.edu/openbook/0309092612/html/88.html, Downloaded Oct. 14, 2005.

Author (Unknown), "Lithium Batteries," Panasonic Ideas for Life, Product brochure, www.panasonic.com/industrial/battery/oem/chem/lith/index.html, Downloaded Oct. 14, 2005.

Author (Unknown), 2000-2005, PowerStream Battery Chemistry FAQ, PowerStream Technology, www.powerstream.com/BatteryFAQ.html, Last Updated Aug. 17, 2003.

\* cited by examiner

METHODS FOR PURIFYING CARBON MATERIALS

CROSS-REFERENCE TO RELATED APPLICATIONS

This application claims priority under 35 U.S.C. 119(e) to U.S. provisional Patent Application 60/553,930 filed Mar. 17, 2004, which is hereby incorporated by reference in its entirety to the extent not inconsistent with the disclosure herein.

STATEMENT REGARDING FEDERALLY SPONSORED RESEARCH OR DEVELOPMENT

This invention was made, at least in part, with United States governmental support awarded by Department of Energy Grant DE-FC36-01GO11090. The United States Government has certain rights in this invention.

BACKGROUND OF INVENTION

Since their discovery in the early 1990s, carbon nanotubes have been the subject of intense scientific research directed toward developing techniques for synthesizing high quality nanotube materials, and evaluating their physical and chemical properties. Carbon nanotubes are allotropes of carbon comprising one or more cylindrically configured graphene sheets. Carbon nanotubes typically have small diameters ($\approx$1-10 nanometers) and large lengths (up to several microns), and therefore may exhibit very large aspect ratios (length to diameter ratio $\approx 10^3$ to about $10^5$). Nanotube materials are often classified on the basis of structure as either single walled carbon nanotubes (SWNTs) or multiwalled carbon nanotubes (MWNTs). Research over the past decade has demonstrated that carbon nanotube materials exhibit extraordinary mechanical, electrical and chemical properties, which has stimulated substantial interest in developing applied technologies exploiting these properties.

Single walled carbon nanotubes (SWNTs) are one class of carbon nanotubes which have been identified as potentially useful materials for a number of applied technologies. SWNTs are made up of a single, contiguous graphene sheet wrapped around and joined with itself to form a hollow, seamless tube having capped ends similar in structure to smaller fullerenes. SWNTs typically have very small diameters ($\approx$1 nanometer) and are often present in curled and looped configurations. The energy band structure of SWNTs varies considerably, and SWNTs exhibit either metallic or semiconductor electrical behavior depending on their precise molecular structure and diameter. Under some experimental conditions, SWNTs undergo efficient self assembly processes that generate bundles (or ropes) of SWNTs aligned along their lengths and strongly bound together by van der Waals forces. SWNTs are chemically versatile materials which have been demonstrated as capable of functionalization of their exterior surfaces and capable of encapsulation of materials within their hollow cores, such as gases and molten materials.

Research over the last decade has identified a number of unique properties of SWNTs which make these materials particularly promising candidate materials for a variety of device applications ranging from a revolutionary class of new electronic devices to composite materials having enhanced mechanical properties. First, SWNTs are believed to have remarkable mechanical properties suggesting their utility as structural reinforcement additives in high strength, low weight and high performance composite materials. For example, calculations and experimental results suggest that the SWNTs have tensile strengths at least 100 times that of steel or any known other known fiber. In addition, SWNTs are stiffer than conventional reinforcement materials, such as carbon fibers, while also exhibiting a very large Young's Modulus (as large as about 1 TPa) when distorted in some directions. Second, SWNTs exhibit useful electrical properties which may serve the basis of a new class of nanotube based electronic devices. For example, the electron transport behavior in carbon nanotubes is predicted to be essentially that of a quantum wire, which has stimulated interest in fabricating ultrafast nanotube based devices. In addition, the electrical properties of SWNTs have been observed to vary significantly upon charge transfer doping and intercalation, which has opened up new avenues for tuning the electrical properties of these materials. Further, due to their nanometer size diameter, mechanical robustness, chemical stability and high electrical conductivity, SWNTs may provide enhanced field emitters in a range of devices, including flat panel displays, AFM tips and electron microscopes. Finally, SWNTs are also believed to possess useful thermal, magnetic and optical properties which make them suitable materials for a range of emerging applied technologies.

The unique chemical and physical characteristics of carbon nanotubes is often severely attenuated or entirely lost when these materials are present with substantial amounts of impurities. Therefore, the successful development of nanotube based technologies taking full advantage of their extraordinary properties depends critically on the availability of sources of substantially pure nanotube materials. Currently available methods for synthesizing SWNTs, however, do not directly result in substantially pure samples containing these materials. Rather, conventional synthesis processes, such as techniques utilizing arc discharge, laser ablation, and chemical vapor deposition, yield a complex reaction product comprising a mixture of SWNTS, carbonaceous impurities and noncarbonaceous impurities. The impurity component of the reaction product generated using many of these techniques is very significant and SWNTs often comprise less than half of the reaction product by weight. Carbonaceous impurities generated in conventional synthesis processes are present in both single layer and multilayer configurations and include amorphous carbon, graphene sheets, graphite, incomplete and complete fullerenes and multiwalled nanotubes. Noncarbonaceous impurities commonly present in SWNT containing samples include residual metal catalyst particles, such as particles comprising nickel, yttrium, iron, molybdenum, palladium, and cobalt, and catalyst support materials, such as ceramic materials.

As a result of associative intermolecular interactions, such as van der Waals interactions, impurities and SWNTs in samples prepared via conventional synthesis techniques are present in highly coupled physical states. For example, the outer surfaces of SWNTs and bundles of SWNTs are typically heavily coated with a variety of single and multilayer carbonaceous impurities. In addition, metal catalyst particles unavoidably generated in catalytic synthesis methods are often entirely or partially encapsulated in high stable multilayers comprising carbonaceous impurities. Associative intermolecular interactions involving these materials present a unique challenge for purifying and isolating SWNTs in samples prepared by conventional synthesis methods. For example, the carbon multilayers surrounding metal catalyst particles severely reduce the effectiveness of purification via dissolution of the particles in acids provided to the sample. In addition, associative interactions between carbonaceous impurities and SWNTs pose significant problems for positioning, aligning and/or integrating SWNTs into desired device configurations.

Significant research has been direct toward developing methods of isolating and purifying SWNTs, due to the inability of conventional synthesis methods to directly produce substantially pure samples of high quality carbon nanotubes. Effective purification methods are capable of removing the wide range of different impurities that exhibit markedly different chemical and physical properties. In addition, effective purification methods are capable of selectively removing a majority of these impurities without causing significant damage to or destruction of the SWNTs. Furthermore, effective purification methods are capable high throughout processing of significant quantities of SWNTs in a relatively small number of efficient purification steps, thereby avoiding unreasonably long processing times.

A number of different approaches have been pursued in recent years for purifying SWNT containing samples. First, several techniques have been developed that are based on chemically modifying impurities to enhance their removal, including selective oxidation processes, such as gas phase oxidation, catalytic oxidation and acid oxidation, and nitric acid and hydrogen peroxide reflux methods. Although chemical modification techniques have been demonstrated as capable of enhancing the purity of SWNT containing samples, these treatments invariably destroy a significant portion of the SWNTs present in the sample, and are not effective at removing metal particulate impurities enclosed in carbon multilayers. Second, purification methods have been pursued based on microfiltration and cross flow filtration techniques. These techniques require a relatively large number of repeated filtration and suspension processing steps, however, making the procedures relatively slow and inefficient. Finally, purification of SWNTs via size exclusion chromatography has also been demonstrated. However, this approach requires use of surfactants for suspension of the SWNTs in the sample undergoing chromatographic separation, which can result in residual surfactant in the purified sample that can deleteriously affect the chemical and physical properties of the purified nanotubes.

The following references relate generally to methods of synthesizing and purifying carbon nanotubes: (1) A. M. Cassell, J. A. Raymakers, J. Kong, H. J. Dai, J. Phys. Chem. B 103(31), (1999), pp. 6484-6492; (2) M. Su, B. Zheng, J. Liu, Chem. Phys. Lett. 322(5), (2000), pp. 321-326; (3) B. Kitiyanan, W. E. Alvarez, J. H. Harwell, D. E. Resasco, Chem. Phys. Lett. 317(3-5), (2000), pp. 497-503; (4) J. H. Hafner, M. J. Bronikowski, B. R. Azamian, P. Nicolaev, A. G. Rinzler, D. T. Colbert, K. A. Smith, R. E. Smalley, Chem. Phys. Lett. 296(1-2), (1998) pp. 195-202 (5) H. M. Cheng, F. Li, G. Su, H. P. Pan, L. L. He, X. Sun, M. S. Dresselhaus, Appl. Phys. Lett. 72(25), (1998), pp. 3282-3284; (6) B. Zheng, Y. Li, J. Liu, Applied Physics A 74, 345-348 (2002); (7) C. Journet, W. K. Maser, P. Bernier, A. Loiseau, M. Lamy de la Chapelle, S. Lefrant, R. Lee, J. E. Fischer, Nature 388, 756-758 (1997); (8) A. Thess, R. Lee, P. Nikolaev, H. Dai, P. Petit, J. Robert, C. Xu, Y. H. Lee, S. G. Kim, A. G. Rinzler, D. T. Colbert, G. E. Scuseria, D. Tomanek, J. E. Fischer, R. E. Smalley, Science 273, (1996) 483-487; (9) M. Holzinger, A. Hirsch, P. Bernier, G. S. Duesberg, M. Burghard, Applied Physics A 70, (2000) 599-602; (10) G. S. Duesberg, J. Muster, V. Krstic, M. Burghard, S. Roth, Appl. Phys. A 67, (1998), 117-119; (11) J. Liu, A. G. Rinzler, H. Dai, J. H. Hafner, R. K. Bradley, P. J. Boul, A. Lu, T. Iverson, K. Shelimov, C. B. Huffman, F. J. Rodriuez-Macias, Y. S. Shon, T. R. Lee, D. T. Colbert, R. E. Smalley, Science 280, (1998) 1253-1256; (12) A. G. Rinzler, J. Liu, H. Dai, P. Nikolaev, C. B. Huffman, F. J. Rodriguez-Macias, P. J. Boul, A. H. Lu, D. Heymann, D. T. Colbert, R. S. Lee, J. E. Fischer, A. M. Rao, P. C. Eklund, R. E. Smalley, Appl. Phys. A 67, (1998) 29-37; (13) Y. Feng, G. Zhou, G. Wang, M. Qu, Z. Yu, Chem, Phys, Lett, 375, (2003) 645-648; (14) T. Takenobu, M. Shiraishi, A. Yamada, M. Ata, H. Kataura, Y. Iwasa, Synthetic Metals 135-136, (2003) 787-788; (15) I. W. Chiang, B. E. Brinson, A. Y. Huang, P. A. Willis, M. J. Bronikowski, J. L. Margrave, R. E. Smalley, R. H. Hauge, J. Phys. Chem. B 105, (2001) 8297-8301.

It will be appreciated from the foregoing that there is currently a need in the art for improved methods for purifying carbon nanotube materials, particularly SWNTs, such that these materials can be effectively integrated into a range of applied technology settings. Specifically, methods are needed for purifying SWNT containing samples generated via conventional SWNT synthesis methods, such as samples comprising mixtures of SWNTS, a range of carbonaceous impurities and metal or metal oxide catalyst particles. In addition, purification methods are needed that provide high yields of high quality nanotube materials, thereby minimizing loss or damage to SWNTs in a sample undergoing purification. Further, low cost and versatile purification methods are needed that are compatible with high throughput processing of large amounts of SWNTs generated by the conventional synthesis techniques.

SUMMARY OF THE INVENTION

The present invention provides processes for purifying samples comprising one or more desired forms of carbon by removing impurities from the sample. Purification methods of the present invention are capable of preferentially removing undesired impurities, thereby increasing the purity a desired carbon material having a selected structure in a sample. Methods of the present invention are capable of effectively removing impurities without substantially damaging or destroying the desired carbon material in a sample undergoing processing. In some embodiments, therefore, the present methods provide a means of purifying a selected carbon material such that the purified selected carbon material has a structure and composition that does not different significantly from its structure and composition in the starting material subject to processing or has a structure that is enhanced after processing via the present methods, such as a structure exhibiting enhanced extent of crystallinity. The present purification methods are versatile and, thus capable of generating a range of substantially pure carbon materials, including carbon nanotubes (SWNTS and MWNTs), fullerenes, and other carbon allotropes such as carbon fibers, carbon films and diamond, from samples generated by a range of synthesis methods, including, catalytic and noncatalytic processes. In one embodiment, the methods of the present invention provide a source of substantially pure, high quality carbon nanotubes, are compatible with high throughput processing of samples comprising large quantities of carbon nanotubes, and require substantially less processing steps than conventional methods of purifying carbon nanotubes.

The present purification methods selectively remove carbonaceous impurities, noncarbonaceous impurities and multiphase impurities having both a carbon-containing portion and a noncarbon-containing portion by exfoliating single and multilayer carbonaceous impurities having structures that differ from the structures of selected carbon materials in the sample. Exfoliation processes useful in the present methods disrupt the structure and arrangement of single and multilayer carbon impurities thereby making these materials more susceptible to removal via subsequent processing steps. Exfoliation of carbon impurities comprising a plurality of layers of graphene, graphite and/or amorphous carbon, for example, makes these materials susceptible to removal by gas phase oxidation at temperatures lower than those corresponding to the gas phase oxidation of thee materials in their unexfoliated forms. In embodiments of the present invention providing high yields of selected carbon materials, exfoliation is carried out under conditions wherein undesired carbonaceous impurities are at least partially exfoliated, while the desired, selected forms of carbon do not undergo substantial exfoliation and/or chemical degradation. Any exfoliation process capable of selectively disrupting the structure and arrangement of single and multilayer carbonaceous impurities may be used in the present purification methods, including methods wherein one or more intercalants are added to the sample and insert into interstitial sites between multilayers of carbonaceous impurities and/or into interstitial sites located between a selected carbon material and a carbonaceous impurities coating its outer surface.

The present invention provides methods that are particularly useful for purifying samples prepared by processes that yield a mixture of a desired carbon material, including carbon nanotubes (SWNTS and/or MWNTs), fullerenes, and/or other selected allotropes of carbon, and impurities comprising residual metal catalyst particles or catalyst support materials, such as transition metal or metal oxide particles partially or completely enclosed in multilayer carbonaceous impurities. In one embodiment, the present invention provides methods for at least partially exfoliating carbonaceous multilayers enclosing metal catalyst particles in a sample. This aspect of the present invention enhances subsequent removal of metal particles because exfoliation ruptures the structure of the carbonaceous layers thereby making the particles susceptible to removal via dissolution. Optionally, methods of this aspect of the present invention may further comprise the step of selectively removing the exfoliated carbonaceous multilayers, for example via wet oxidation, which further exposes the outer surfaces of the metal particles and enhances subsequent removal via dissolution. This aspect of the present invention provides versatile purification methods useful for increasing the purity of a desired carbon material in samples generated by virtually any catalytic synthesis techniques employing metal or metal based catalysts such as metal carbonyls.

In one aspect, the present invention provides a method of purifying a sample containing a carbon material having a selected structure wherein at least partial exfoliation of undesired single and multilayer carbonaceous impurities present in the sample allows for effective removal of impurities having a range of chemical compositions and physical states. A sample is provided containing the carbon material having a selected structure and impurities. The impurities present in the sample comprise carbonaceous impurities comprising one or more carbon layers having structures different than that of the selected carbon material undergoing purification. Optionally, the impurities present in the sample comprise noncarbonaceous impurities, such as metal particles and/or metal derivative particles such as metal oxide particles, and multiphase impurities, such as metal particles and/or metal derivative particles such as metal oxide particles partially or completely enclosed in multilayer carbonaceous impurities.

At least a portion of the carbon layers of the carbonaceous impurities are exfoliated, and the impurities are removed thereby purifying the sample. Exfoliation of at least a portion of the carbon layers in this method of the present invention allows for effective removal of carbonaceous impurities, non-carbonaceous impurities and multiphase impurities. In one embodiment, removal of exfoliated carbonaceous materials directly purifies the sample. Any method of removing exfoliated carbonaceous material may be used in the present methods provided that it does not substantially damage or destroy the selected carbon material undergoing purification, including but not limited to chemical transformation methods (e.g. wet oxidation and dissolution), filtration (e.g. cross flow or microfiltration methods) and chromatographic methods (e.g. size exclusion chromatography).

In another embodiment, exfoliation processing steps exfoliate at least a portion of carbon multilayers enclosing metal particles in the sample undergoing processing. In this embodiment, exfoliation at least partially exposes the surface of the metal particles, thereby allowing for their effective removal by a wide variety of removal methods. Removal of the exposed metal particles may be provided by any technique known in the art including, but not limited to, dissolution in a solution added to the sample, for example by refluxing the sample in a concentrated inorganic and/or organic acid, and/ or treatment with an appropriate gas, for example by treatment with a halogen gas, such as chlorine at high temperatures (e.g. at or above about 900 degrees Celsius). Optionally, the purification methods of the present invention may further comprise the step of annealing the sample after the impurities have been removed. This optional step is beneficial in some applications as it may repair any damage to the carbon material having a selected structure that occurs during processing. It also removes residual reactant and solvent(s) and/or enhances the crystalline structure of the selected carbon material.

Purification methods of the present invention are capable of enriching the purity of a single selected carbon material or plurality of different selected carbon materials. Selectivity in the present invention is provided by processing steps that are capable of exfoliating a selected set of materials corresponding to undesired impurities, while avoiding exfoliating or damaging to the desired carbon material(s) in the sample undergoing purification. In one embodiment, for example, the present invention provides methods for selectively enriching the purity of single walled carbon materials, such as SWNTs and/or single walled fullerenes, by selectively exfoliating carbonaceous materials that comprise a plurality of carbon multilayers, such as graphene multilayer structures, graphite multilayers, amorphous carbon multilayers, multiwalled fullerenes, MWTNs or any combination of these materials. Selective exfoliation in this aspect of the present invention allows for multilayer carbonaceous impurities to be efficiently removed, for example by selective oxidation, without significant loss of or damage to the desired single walled carbon materials. Alternatively, the present invention provides methods for selectively enriching the purity of one or more selected multilayer carbon structures, such as MWNTs, multiwalled fullerenes, diamond, carbon fibers, carbon films or any combination of these materials. In this embodiment, the exfoliation technique employed and experimental conditions of the sample (e.g. temperature, sample composition, composition of exfoliation initiator added to the sample etc.) are chosen such that undesired multilayered carbonaceous impurities are selectively exfoliated and subsequently removed, resulting in enhancement of the purity of the selected multilayer carbon structures in the sample.

Exfoliation of multilayer carbonaceous impurities can be carried out in any manner which promotes effective removal of impurities, while not substantially damaging or destroying the carbon materials having a selected structure in the sample. Exfoliation processes preferred for some application are rapid exothermic chemical reactions or physical changes that exfoliate carbonaceous materials without damaging desired components of a sample. In some embodiments, exfoliation is carried out by addition of one or more intercalants to the sample that insert into interstitial sites between carbon multilayers of multilayer carbonaceous impurities and/or insert into interstitial sites between a selected carbon material, such as SWNTs or MWNTs, and a carbonaceous impurity coating the outside of the selected carbon material.

In one embodiment of the present invention, addition of an intercalant generates intercalated carbon materials having intercalants present in interstitial sites between carbon multilayers comprising carbonaceous impurities. The presence of intercalants between the multilayers of carbonaceous impurities makes these materials susceptible to various selective exfoliation processes. For example, some intercalants weaken or disrupt the intermolecular or intramolecular forces between adjacent multilayers resulting in more selective and more complete exfoliation. Insertion of some intercalants of the present invention between multilayers results in an expansion of the interlayer distance separating adjacent multilayers and/or may provide a reactant for chemical reactions that initiate selective exfoliation of multilayer carbonaceous impurities.

Alternatively, addition of intercalants in the present invention generates intercalated carbon materials having intercalants present in interstitial sites between a selected carbon material and an impurity comprising a carbonaceous outer layer coating the selected carbon material. This aspect of the present invention is useful for disrupting associative interactions, such as van der Waals interactions, between impurities and desired carbon materials in a sample. In one embodiment, insertion of intercalants into interstitial sites between a selected carbon material and a layer comprising carbonaceous impurity provides a means of separating the selected carbon material from impurities that associatively interact with it. This aspect of the present invention is particularly useful for separating and removing single or multiple layer carbonaceous impurities coating the outer surfaces of SWNTs and MWNTs. This aspect of the present invention is useful for removing coatings of carbonaceous impurities on carbon nanotubes which affect their physical, electrical and chemical properties and present difficulties in integrating these materials into desired device configurations.

In one embodiment of the present invention, exfoliation is achieved by adding an exfoliation initiator to a sample containing one or more intercalants which reacts with intercalants in intercalated carbon layers, thereby initiating selective exfoliation. Exemplary exfoliation initiators react exothermically with intercalants in intercalated carbon layers and, optionally initiate an expansion of material present between carbon layers, for example by generating a gaseous reaction product. In another embodiment, exfoliation is achieved by subsequently raising the temperature of the intercalated carbon layers, for example by heating the sample or exposing the sample to electromagnetic radiation. Rapidly raising the temperature of intercalated samples provides sufficient energy to selectively exfoliate the carbon layers of carbonaceous impurities.

As many carbonaceous impurities are amphoteric in nature, intercalants useful in this aspect of the present invention include, electron donor intercalant, such as alkali metals (e.g. Li, K, Na, Rb and Cs), and electron acceptor intercalants, such as halogens (e.g. fluorine, bromine and iodine), metal chlorides and acids (e.g. lewis acids such as nitric acid, perchloric acid, sulfuric acid; and formic acid). The present invention includes methods wherein more than one type of intercalant is added to the sample undergoing purification, for example methods in which carbon layers are bi-intercalated. The present invention includes intercalation processing of samples via electrochemical methods, including but not limited to, intercalation initiated via chronoamperometric or chronovoltametric methods. Intercalants may be provided as liquids, gases and in solutions added to samples undergoing purification. Preferred intercalants for applications requiring high yields of high quality carbon materials do not significantly damage or disrupt the desired carbon material undergoing purification.

The present methods are capable of processing samples comprising complex mixtures of materials having a wide range of chemical compositions, structures and physical states. For example, the present methods are useful for purifying sample generated by virtually all catalytic and noncatalytic synthesis methods for making SWNTs, MWNTs, catalytically grown carbon fibers, catalytically grown carbon films and diamond, including but not limited to, arc-discharge methods, chemical vapor deposition methods, plasma enhanced chemical vapor deposition methods, high pressure carbon monoxide disproportionation methods; pyrolytic methods, flame synthesis methods, electrochemical synthesis methods; and laser ablation methods. The versatility with respect to the type of carbon material that is purified in the present methods largely arises from the use of selective exfoliation wherein impurities having structures similar to, but not the same as, a desired carbon material may be exfoliated and removed without substantial loses or damage to the desired carbon material. In addition, this versatility arises from the use of selective exfoliation to render noncarbonaceous impurities in a state susceptible to removal via dissolution.

The present invention provides a method of purifying a sample containing SWNTS by selectively removing graphene layers, graphite, amorphous carbon, incomplete fullerenes, metal particles or any combination of these materials. In one embodiment, methods of this aspect of the present invention are capable of providing purified samples corresponding to a yield of SWNTs selected over the range of about 15% to about 20% and a purity selected from about 90 to about 98% by weight. In the context of this description, the term yield refers to the weight ratio (in percent) of the achieved purified SWNT to the initial amount of carbon material before purification (e.g. 1 gram of carbon will provide 150 milligram of purified SWNT in a process providing a 15% yield). In another embodiment, the present invention provides a method of purifying a sample containing MWNTS by selectively removing graphene layers, graphite, amorphous carbon, incomplete fullerenes, metal particles or any combination of these materials. Further, the methods of the present invention are applicable to purifying nanotubes made from other materials, such as boron nitride nanotubes. The present methods are not limited to purifying carbon nanotube containing samples, and are capable of isolating and purifying other useful allotropes of carbon, such as single walled fullerenes, multiwalled fullerenes, diamond, carbon fibers, carbon films, and carbon whiskers.

The present methods are also suitable for purification of diamond materials. Conventional diamond synthesis methods, such as high temperature-high pressure processing of molten graphite and chemical vapor deposition methods, generate diamond-containing samples having significant carbonaceous impurities, such as graphite. Methods of the present invention are useful for exfoliating these carbonaceous impurities, thereby allowing for more easy removal of the exfoliated carbonaceous impurities.

In another aspect, the present invention provides a method of purifying a sample containing a carbon material having a selected structure comprising the steps of: (1) providing the sample containing the carbon material having a selected structure and impurities comprising carbonaceous impurities, wherein the carbonaceous impurities comprising one or more carbon layers having a structure different than that of the selected structure; (2) exfoliating at least a portion of the carbon layers of the carbonaceous impurities, thereby generating exfoliated carbonaceous material; and (3) removing the impurities, thereby purifying the sample containing a carbon material having a selected structure. Optionally, methods of this aspect of the present invention may further comprise the step of annealing the purified sample to repair any damage incurred during purification processing, remove residual exfoliation reactants and solvent and/or enhance the crystal structure of the carbon material having a selected structure.

In another aspect, the present invention provides a method of exfoliating at least a portion of a plurality of carbon multilayers at least partially enclosing metal particles in a sample generated in the synthesis of carbon nanotubes comprising the steps of: (1) providing the sample generated in the synthesis of carbon nanotubes containing the metal particles, wherein each metal particle is at least partially enclosed by the carbon multilayers; (2) adding an intercalant to the sample, wherein the intercalant inserts between at least a portion of the carbon multilayers, thereby generating intercalated carbon multilayers having intercalant present between the carbon multilayers; and (3) adding an exfoliation initiator to the sample which reacts with intercalant present between the carbon multilayers, thereby exfoliating at least a portion of the carbon multilayers.

In another aspect, the present invention provides a method of removing carbonaceous coatings from the outer surfaces of carbon nanotubes comprising the steps of: (1) providing a sample comprising the carbon nanotubes, wherein at least a portion of the outer surfaces of the nanotubes are partially or completely coated with the carbonaceous coatings, and wherein the carbonaceous coatings have a structure different from that of the nanotubes; (2) adding an intercalant to the sample, wherein the intercalant inserts into interstitial sites between the nanotubes and the carbonaceous coating; and (3) adding an exfoliation initiator to the sample which reacts with the intercalant, wherein the reaction between the intercalant present between the carbon nanotubes and the carbonaceous coating and the exfoliation initiator exfoliates the carbonaceous coating, thereby removing the carbonaceous coatings from the outer surfaces of the carbon nanotubes. Optionally, methods of this aspect of the present invention may further comprise the step of annealing the purified sample to repair any damage incurred during purification processing, remove residual exfoliation reactants and solvent and/or enhance the crystal structure of the carbon material having a selected structure.

In another aspect, the present invention provides a method of purifying a sample containing single walled nanotubes comprising the steps of: (1) providing the sample containing the single walled nanotubes and impurities comprising metal particles, wherein the metal particles are at least partially enclosed by a plurality of carbon multilayers having a structure different from that of the carbon nanotubes; (2) adding an intercalant to the sample, wherein the intercalant inserts between at least a portion of the carbon multilayers enclosing the metal particles, thereby generating intercalated carbon multilayers having intercalant present between the carbon multilayers; and (3) adding an exfoliation initiator which reacts with intercalant present between the carbon multilayers, thereby exfoliating at least a portion of the carbon multilayers and exposing the surface of the metal particles; and (4) refluxing the sample in concentrated hydrochloric acid, thereby dissolving the metal particles and purifying the sample containing single walled nanotubes. Optionally, methods of this aspect of the present invention may further comprise the step of annealing the purified sample to repair any damage incurred during purification processing, remove residual exfoliation reactants and solvent and/or enhance the crystal structure of the carbon material having a selected structure.

BRIEF DESCRIPTION OF THE DRAWINGS

FIG. 3A shows data for the conventional reflux purification methods. The plots in FIG. 3A correspond to: (1) As-received Carbolex, (2) after processing in $HNO_3$ and $H_2O_2$, (3) after heating at various temperatures in wet air (3) 350° C., (4) 425° C., (5) 480° C., (6) 510° C., (7) 520° C. and finally (8) after heat treatment in $N_2/H_2$ forming gas at 750° C. The plots in FIG. 3B correspond to: (1) As-received Carbolex, (2) after doping with K, reacting with EtOH and HCl reflux, (3) after 350° C. wet oxidation, (4) after 425° C. wet oxidation and (5) after annealing at 750° C. in $N_2/H_2$ forming gas. Each oxidation step was followed by HCl reflux.

DETAILED DESCRIPTION OF THE INVENTION

Figure 1A:
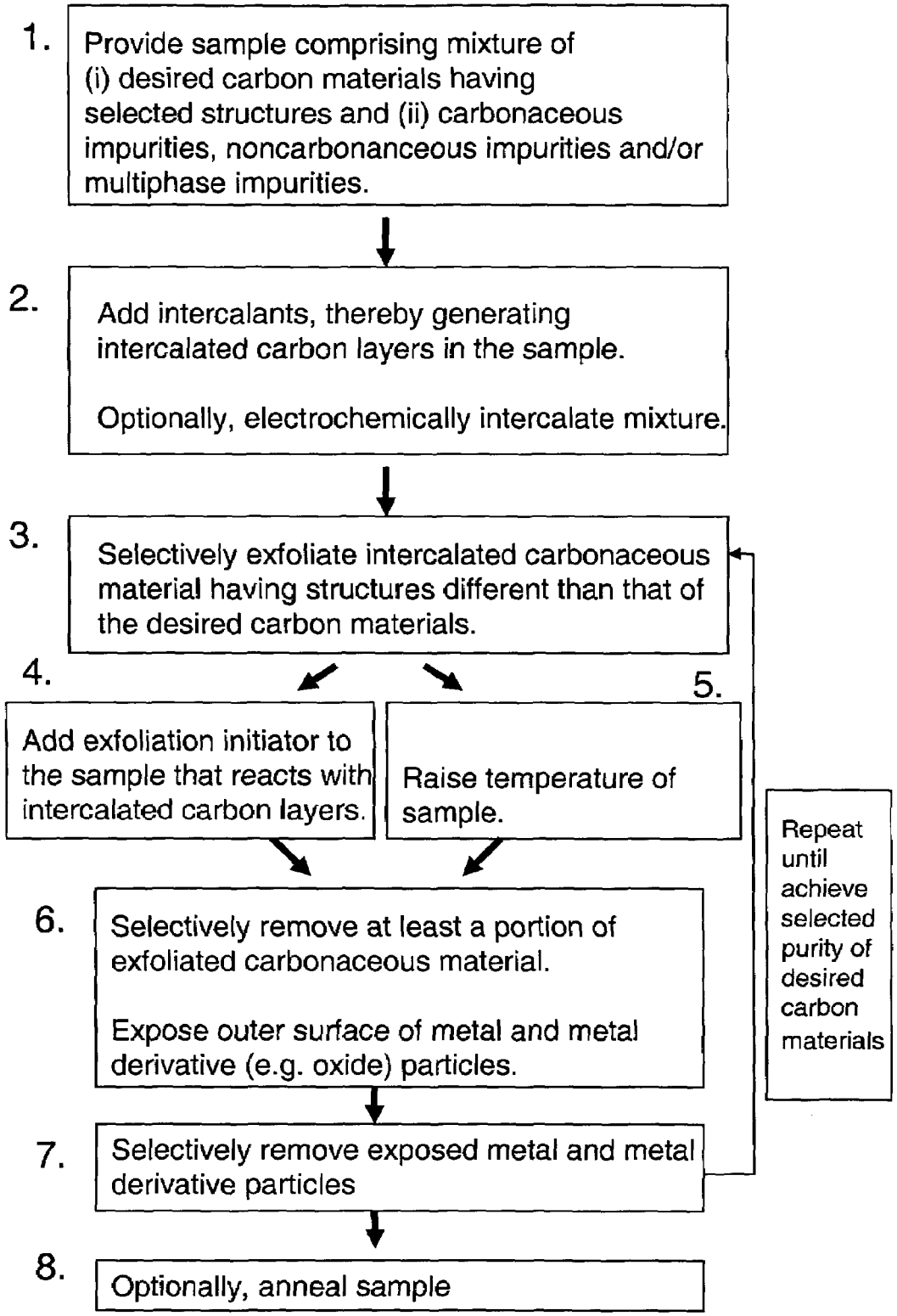
FIG. 1A provides a schematic diagram showing processing steps in a purification method of the present invention useful for removing carbonaceous impurities and metal catalyst particles from a sample containing one or more desired carbon materials having selected structures.

Referring to the drawings, like numerals indicate like elements and the same number appearing in more than one drawing refers to the same element. In addition, hereinafter, the following definitions apply:

"Carbon material" and "carbonaceous materials" are used synonymously in the present description and refer to a class of compounds comprising carbon atoms. Carbon materials include allotropes of carbon such as SWNTs, MWNTs, single walled and multiwalled fullerenes, graphite, graphene, amorphous carbon, carbon fibers, carbon films, carbon whiskers, and diamond, and all derivatives thereof. Carbon materials in the present invention may be entirely comprised of carbon atoms or may include carbon in combination with other elements, such as dopants, intercalants and functional groups conjugated to the carbon structures. Depending on the composition of the sample and intended outcome of the purification method, carbon materials may be classified as desired carbon materials or undesired carbonaceous impurities. Desired carbon materials have a selected structure (which depends on the precise application of the method) and are purified by the present methods. Carbonaceous impurities, in contrast, have a structure different from that of the desired carbon materials and are subject to removal by the present methods. Carbon materials, including both desired carbon materials and carbonaceous impurities, may exist in single or multilayer forms.

The term "carbon layer" refers to a structure of wherein certain atoms are held together by directed covalent, ionic or other strong intramolecular forces. Layers may be planar or contoured. Interactions between different carbon layers may be via intermolecular forces, such as van der Waals interactions. Examples of carbon layers include, but are not limited to, graphite layers, graphene sheets, walls of a multiwalled or single walled fullerenes, MWNTs, SWNTs, layers comprising carbon fiber and carbon films. Carbon layer may also refer to a carbonaceous impurity coating the outer surface of a particle, such as a residual metal catalyst particle, metal derivative particles such as metal oxide particles or particle comprising catalyst support material, and a carbonaceous impurity coating the outer surface of desired a carbon material, such as a carbon nanotube (SWNT and MWNT), a fullerene, other desired carbon allotrope. The terms "carbon layer" and "carbon layers" does not limit the size, shape or orientation of the layers.

"Exfoliation" refers to a process whereby adjacent layers are separated by a distance such that the strength of associative interactions between adjacent layers is decreased. Exfoliation of a multilayer material, such as a plurality of graphene sheets or graphite layers, includes separation of a single layer comprising a multilayer structure and includes involve separation of a plurality of layers comprising a multilayer structure. Exfoliation may involve separation of two different materials or separation of different layers of a multilayer material by disruption of associative interactions, such as van der Waals interactions, that hold the materials together. For example, the present invention provides methods of exfoliating carbonaceous impurities that coat a desired carbon material such as a carbon nanotube (SWNT or MWNT), fullerene, carbon fiber, diamond, and carbon film. In addition, the present invention provides methods of exfoliating carbonaceous impurities that coat particles, such as metal catalyst particles, metal derivative particles such as metal oxide particles, and particles comprising catalyst support materials. The present invention provides methods wherein carbon layers comprising carbonaceous impurities are either partially or entirely exfoliated.

"Intercalant" refers to a material that inserts into interstitial sites and/or endohedral sites in a single or multilayer receiving material. Addition of an intercalant to a receiving material comprising a carbon material (e.g. graphite, graphene, amorphous carbon, MWNTs etc.), generates intercalated carbonaceous material. In some cases, the intercalated carbonaceous material has a well defined stoichiometry with respect to the amount of intercalant associated with the carbon material. In one embodiment of the present invention, intercalant is added to a sample and inserts into interstitial sites between carbon layers in multilayer carbonaceous impurities and/or inserts into interstitial sites between a desired carbon material and a carbonaceous impurity coating its outer surface.

"Exfoliation initiator" refers to a material that reacts with intercalant in intercalated carbonaceous material, thereby causing at least partial exfoliation of the intercalated carbonaceous material. Exfoliation initiators may comprise molecules, ions, atoms or complexes thereof, and may be in solid, gas, liquid or solution phases.

"Metal catalyst particles" refer to metal particles generated by catalytic synthesis methods for generating carbon materials. Metal catalyst particles typically comprise transition metals and mixtures thereof including, but not limited to, nickel, molybdenum, palladium, yttrium, iron, copper, molybdenum; and cobalt.

"Purification" refers to a process whereby the percentage (or fraction) of a desired material in a sample is increased via processing. Purification methods of the present invention may increase the percentage by mass, percentage by weight, percentage by volume and/or mole fraction of one or more selected carbon materials in a sample undergoing processing. Purification methods of the present invention useful for some applications are capable of providing a purified selected carbon material having a structure and composition that does not vary significant from its structure and composition in the starting material subject to processing or has a structure that is enhanced after processing via the present methods, such as a structure exhibiting an enhanced extent of crystallinity. For example, methods of the present invention are capable of purifying a SWNT-containing sample such that the purified SWNTs are not present in derivatized (i.e. oxidized) or functionalized forms.

In the following description, numerous specific details of the devices, device components and methods of the present invention are set forth in order to provide a thorough explanation of the precise nature of the invention. It will be apparent, however, to those of skill in the art that the invention can be practiced without these specific details.

This invention provides methods of purifying samples containing a carbon material having a selected structure by removing carbonaceous, noncarbonaceous and multiphase impurities from the sample. Particularly, the present invention provides purification methods for samples containing selected carbon materials, such as carbon nanotubes (SWNTs and MWNTs), wherein carbonaceous impurities comprising carbon layers having a different structure than the selected carbon material are exfoliated, thereby facilitating subsequent removal of impurities via chemical transformation, for example by selective oxidation and/or dissolution processes.

FIG. 1A provides a schematic diagram showing processing steps in a purification method of the present invention useful for removing carbonaceous impurities and metal catalyst particles from a sample containing one or more desired carbon materials having selected structures. As shown in process step 1 of FIG. 1A, a sample is provided for processing that comprises a mixture of one or more desired carbon materials having selected structures and impurities. Impurities in the sample may have a range of different chemical compositions and physical states, including carbonaceous impurities comprising carbon materials having structures different from that of the desired carbon material, such as impurities comprising single or multilayer forms of graphene, graphite, amorphous carbon, carbon fibers, carbon films, MWNTs and selected combinations of these materials, noncarbonaceous materials such as metal catalysts, metal derivatives including metal oxides, catalyst support materials and aggregates and particles thereof, and multiphase impurities, such as metal catalyst particles partially or completely enclosed in multilayer carbonaceous impurities.

Referring again to FIG. 1A, an intercalant is added to the sample in process step 2, thereby generating intercalated carbon layers in the sample. In one embodiment, enough intercalant is added to allow the formation of intercalated carbon layers having the highest possible stoichiometry, and in some embodiments the sample containing intercalant is allowed to react to substantial completion. Intercalants provided to the sample may insert into interstitial sites between adjacent layers in multilayer carbonaceous impurities and/or insert into interstitial sites located between a desired carbon material and a carbonaceous impurity coating its outer surface. In addition, intercalants added to the sample may insert into endohedral sites of carbonaceous impurities. Intercalants may be added to the sample in liquid form, gaseous form or in a carrier solution. In methods of the present invention using highly reactive intercalants, such as alkali metals, the sample is optionally evacuated and heated to remove moisture and oxygen prior to the addition of the intercalants, and the sample containing intercalant is optionally kept in an inert atmosphere for the entire duration of the intercalation reaction. Optionally, the sample containing intercalants is electrochemically intercalated by application of a constant or variable electric potential to the sample during intercalation, as also indicated in process step 2.

As shown in process steps 3, 4 and 5 of FIG. 1A, the sample having intercalated carbon layers is selective exfoliated, thereby generating exfoliate carbonaceous material. In the context of this description selective exfoliation refers to a process whereby carbon materials comprising impurities undergo at least partial exfoliation, while carbon materials undergoing purification (having a selected structure) do not undergo substantial exfoliation. FIG. 1A shows two pathways (process steps 4 & 5) for achieving selective exfoliation. In the embodiment shown in process step 4, an exfoliation initiator is added to the sample that undergoes a chemical reaction with intercalants in the intercalated carbon layers. Preferably for some applications, the reaction between the exfoliation initiator and intercalants in the intercalated carbon layers is very a fast exothermic reaction and, optionally, a reaction that results in an expansion of material between intercalated layers, for example by forming a product in the gas phase. The reaction between the exfoliation initiator and intercalants in the intercalated carbon layers is selective such that desired carbon materials having a selected structure are not lost or damaged during the exfoliation process. An alternative route to selective exfoliation is shown in process step 5. In this embodiment, exfoliation of intercalated carbon layers is initiated by raising the temperature of the sample, preferably for some embodiments raising the temperature very rapidly.

Referring to process step 6 of FIG. 1A, exfoliated carbonaceous material is selectively removed from the sample. Removal of exfoliated carbonaceous material may be achieved by any method that does not significantly destroy or damage the selected carbon material undergoing purification. In some embodiments, chemical transformation of exfoliated carbonaceous materials is used to direct remove impurities, such as selective oxidation in wet air at successively higher temperatures. In addition, exfoliated carbonaceous material may be removed using separation techniques, such as microfiltration and chromatography. As also shown in process step 6 in FIG. 1A, in one embodiment wherein the sample contains multiphase impurities comprising metal, metal derivative or ceramic particles partially or completely enclosed in a plurality of carbon impurity layers, exfoliation and subsequent removal of exfoliated carbonaceous material exposes the outer surface of the metal or metal derivative residual catalyst particles. Metal particles having an exposed outer surface are subsequently removed via dissolution, for example dissolution in concentrated inorganic or organic acid added to the sample. As shown in FIG. 1A, selective exfoliation steps (process steps 3, 4 and 5) and impurity removal steps (process steps 6 and 7) may be repeated until a selected purity of the desired carbon material having a selected structure is achieved.

Figure 1B:
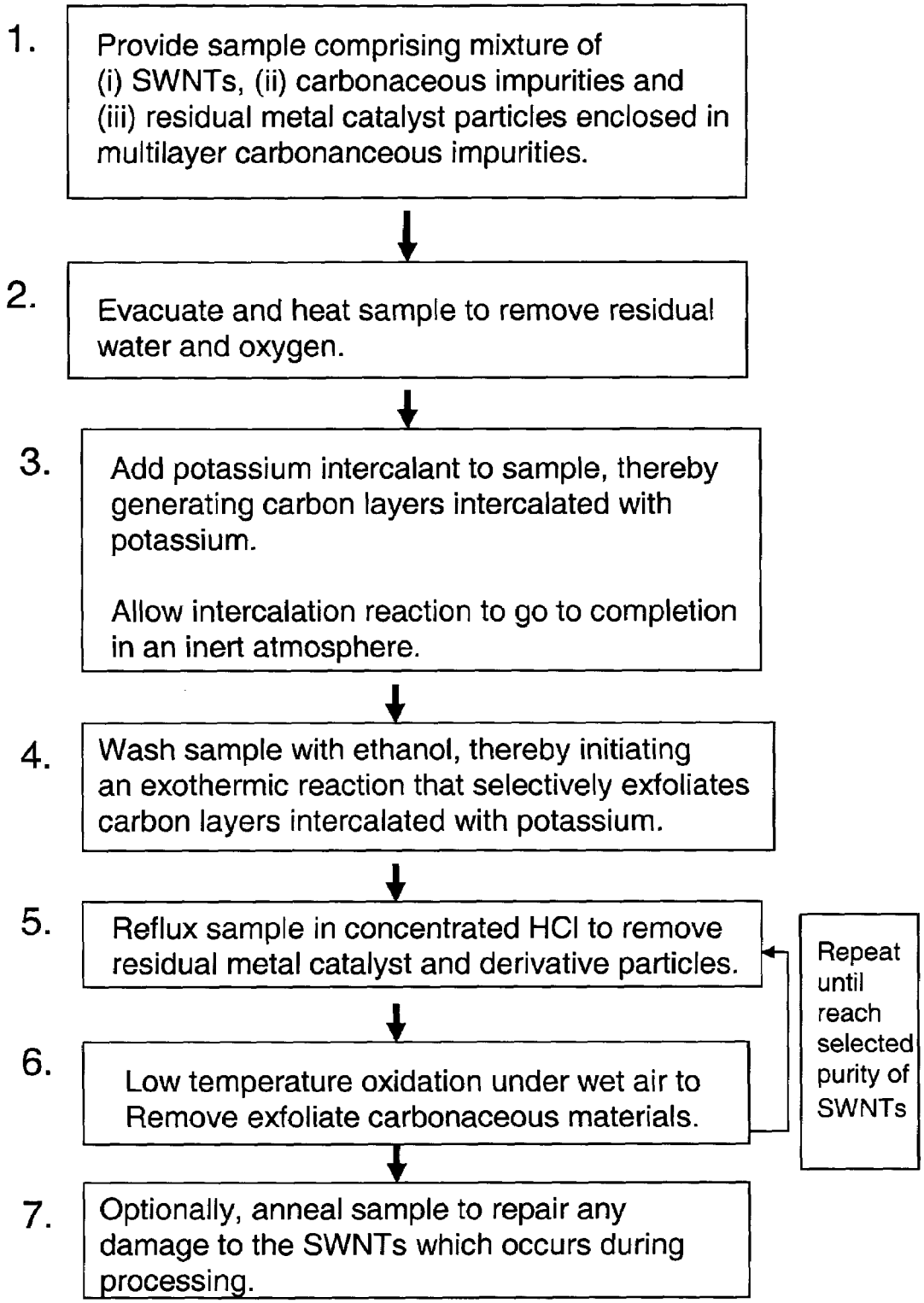
FIG. 1B provides a schematic flow diagram showing processing steps in a purification method using potassium intercalation for purifying SWNTs generated by catalytic synthesis techniques, such as arc-discharge, gas phase catalysis (e.g. metal carbonyls) and laser ablation synthesis methods.

FIG. 1B provides a schematic flow diagram showing processing steps in a purification method using potassium intercalation for purifying SWNTs generated by catalytic synthesis techniques, such as arc-discharge and laser ablation synthesis methods. As shown in process step 1 of FIG. 1B, a sample is provided for processing that comprises a mixture of (i) SWNTs, (ii) carbonaceous impurities having structures different than that of the SWNTs and (iii) residual metal catalyst particles enclosed in multilayer carbonaceous impurities carbonaceous impurities having structures different than that of the SWNTs. The sample undergoing processing is evacuated and heated, for example to a temperature of 300 degrees Celsius, to remove any trace of water and oxygen, as illustrated in processing step 2 of FIG. 1B. Potassium intercalant is added to the sample and allowed to react to completion in an inert atmosphere (e.g. argon), thereby generating carbon layers intercalated with potassium (see process step 3). In one embodiment where carbonaceous impurities in the sample include graphite and/or graphene layers, the amount of potassium added to the sample is sufficient to form the most potassium rich intercalation material, such as an intercalation material having the stoichiometry of one potassium atom to eight carbon atoms (i.e. $KC_8$).

Referring to process step 4 in FIG. 1B, the intercalated sample is reacted with an exfoliation initiator comprising ethanol, which initiates an exothermic reaction that selectively exfoliates carbon layers intercalated with potassium. In one embodiment, ethanol reacts with potassium present in intercalated carbon layers to generate potassium alkoxide and hydrogen gas:

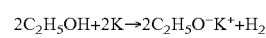

$$2C_2H_5OH + 2K \rightarrow 2C_2H_5O^-K^+ + H_2$$

In one embodiment, the sample is reacted with ethanol until a neutral pH is observed, indicating that substantially all the intercalated potassium has undergoing reaction. Exfoliation generates exfoliated carbonaceous material and also ruptures the multilayer structure of carbonaceous impurities enclosing the residual metal catalyst particles. Exfoliation provided by this processing step can disrupt and/or fracture the shell-like multilayer structure of carbonaceous impurities enclosing the residual metal catalyst particles resulting in at least partial exposure of their outer surfaces.

As shown in process steps 5 and 6 in FIG. 1B, the sample is refluxed in concentrated hydrochloric acid to dissolve metal particles and subjected to low temperature oxidation under wet air to selectively remove exfoliated carbonaceous materials. Removal of the exfoliated carbonaceous materials further exposes the outer surface of the metal particles, thereby enhancing their removal via subsequent additional processing steps refluxing the sample in concentrated hydrochloric acid. Oxidation in wet air may also at least partially convert the metal particles to metal derivative particles such as metal oxide or metal hydroxide particles. This oxidation process results in an expansion of the volume of the particle due to the lower density of the oxide and/or hydroxide product that further disrupts the shell-like multilayer structure of carbonaceous impurities enclosing the residual metal catalyst particles and also increases the efficiency of subsequent removal of metal particles via dissolution. Process steps 5 and 6 are optionally repeated until a desired purity of the SWNTs is achieved. In one embodiment, the sample is subjected to wet air oxidation at successively higher temperatures each time that process steps 5 and 6 are repeated. As indicated in process step 7 of FIG. 1B, the purified sample is optionally annealed in nitrogen to repair any damage to the SWNTs which occurs during processing.

The methods of the present invention may be realized using a wide variety of instrumentation and reagents well known in the art. Use of a two bulb glass reactor and a two zone furnace is beneficial for adding gas phase potassium to the sample in a manner which minimizes the likelihood of condensing potassium on the sample undergoing processing. In this embodiment, the sample undergoing processing is held in a first bulb maintained at a slightly larger temperature and in fluid communication with a second bulb containing the potassium intercalant. Manipulation of samples undergoing purification in a glove box filled with any inert gas, such as argon, is helpful for avoiding inadvertent premature oxidation of intercalants comprising highly reactive alkali metals (e.g. K and Na) during intercalation of the sample. A variety of methods and instrumentation well known in the art may be used for electrochemically intercalating samples including voltammetric intercalation and electrolysis. Any intercalants and/or exfoliation initiators can be used in the present methods including electron donor intercalants, electron acceptor intercalants and combinations of both electron donor intercalants and electron acceptor intercalants. Exemplary intercalants useful for preparing intercalated carbon layers include, but are not limited to, Li, Na, K, Rb, Cs, $F_2$, $Cl_2$, $Br_2$, $I_2$, chromium oxides such as $CrO_3$, metal chlorides such as $CdCl_2$, $YCl_3$, $AlCl_3$, $MoCl_5$, $ZnCl_2$, $FeCl_3$, sulfuric acid, nitric acid, perchloric acid, formic acid.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations and additional processing steps including, but not limited to, sample transfer steps, temperature variation steps and cycles, product purity analysis, additional separations including phase separations, chromatographic separation, separation by filtration techniques such as microfiltration, removal of excess reagents such as process steps removing intercalants and/or exfoliation initiators added to the sample undergoing processing, and solution phase oxidation of carbonaceous impurities.

The following references relate generally to methods of exfoliating carbon materials: (1) "Exfoliation of carbon fibers", M. Toyoda and M. Inagaki, Journal of Physics and Chemistry of solids, 65 (2004) 109-117; (2) Review of the doping of carbon nanotubes (multiwalled and single-walled)", L. Duclaux, Carbon, 40 (2002), 1751-1764; (3) "Exfoliation process of graphite via intercalation compounds with sulfuric acid", M. Inagaki, R. Tashiro, Y. Reactino and M. Toyoda, Journal of Physics and Chemistry of solids, 65 (2004) 133-137; (4) "Graphite exfoliated at room temperature and its structural annealing" M. Inagaki and M. Nakashima, Carbon, Vol. 32, No. 7 (1994), 1253-1257; (5) "Exfoliation process and elaboration of new carbonaceous materials", Fuel, Vol 77, No. 6, (1998) 479-485; and (6) "Electrochemical intercalation of $ZnCl_2$—$CrO_3$-GIC (graphite intercalation compound) with sulphuric acid", J. M. Skowronski and J. Urbaniak, Polish J. Chem. 78 (2004) 1339-1344.

All references cited in this application and all references cited in these references are hereby incorporated in their entireties by reference herein to the extent that they are not inconsistent with the disclosure in this application. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques specifically described herein are intended to be encompassed by this invention.

EXAMPLE 1

Purification of Carbon Single Walled Nanotubes Produced by Arc-Discharge Methods The ability of methods of the present invention using potassium intercalation to purify SWNTs was experimentally verified by purifying SWNT containing samples generated using arc discharge synthesis methods. Thermogravimetric analysis (TGA), Raman spectrometry, X-ray diffraction (XRD) and transmission electron microscopy (TEM) were used to characterize the results of each processing step, and to evaluate the effectiveness of the purification treatment. The purified SWNT products generated by the present methods were compared to SWNT samples purified via conventional acid reflux purification methods. This potassium intercalation step was found to be particularly useful for exfoliating the graphitic shell structure that typically surround residual metal catalyst particles present in samples prepared by many catalytic synthesis methods. By exfoliating the shell structure, subsequent treatments are more efficacious for removing the metal catalyst particles.

1.a Introduction

There have been many investigations of single-wall carbon nanotubes (SWNTS) since these materials were first reported in the early Nineties. The unique physical, chemical and mechanical properties of SWNTs make them candidate materials for service in electronic devices, energy storage systems and structural composites, for example. To obtain behavior in these applications that can be unambiguously and solely attributed to nanotubes, purification of the SWNTs is an essential step, since raw materials are typically composed of less than half SWNTs. The efficiency of any purification method is strongly dependent on the raw materials, which differ for the three methods typically used for the production of SWNTs: chemical vapor deposition (CVD), electric arc-discharge and laser ablation.

It has proved a serious challenge to remove multiwalled nanotubes and shells, incomplete fullerenes, graphites, and disordered carbon impurities in the raw materials without also destroying the SWNTs, since all these components are similar chemically. In this example, we concentrate on the purification of SWNTs prepared by arc-discharge and laser oven/ablation because these methods produce SWNTs with a narrow distribution of tube diameters. Important impurities in materials prepared by arc-discharge and laser oven/ablation methods also include metal catalyst particles, which are typically surrounded by shells of polyaromatic carbons. The shell structure protects the metal particles from dissolution in inorganic acids.

Many procedures for purifying SWNTs are based on chromatography and filtration methods, or on selective oxidation processes (i.e. acid oxidation and/or gas oxidation), or a combination of these methods. For any method of purification, a compromise is typically made between impurity removal and the final yield of SWNTs. Another concern is that some purification processes can damage the nanotubes. Refluxing in nitric acid, for example, is effective for removing metallic impurities, but also produces defects in the tubes.

Method of the present invention using a potassium intercalation processing step was used to purify arc-derived carbon SWNTs, which are generally recognized as the most challenging to purify. The present purification methods procedure comprise the steps of: (a) intercalating the SWNT containing sample with potassium (b) reacting/exfoliating the resulting powder with ethanol and (c) wet air oxidation at successively higher temperatures, with each step followed by a reflux in concentrated hydrochloric acid. Low temperature wet air oxidation has generally been thought to remove the more disordered carbon layer coatings on metal catalyst particles, allowing the dissolution of the metal in an acid. Oxidation treatments at higher temperatures remove the more stable carbon layer graphitic shells surrounding the catalyst metal particles. During these wet air oxidation treatments, the metal is converted to an oxide and/or hydroxide. The expansion of the metal due to the lower density of the oxide (densities for Ni and NiO are respectively 8.90 and 6.67) cracks the carbon shells and the metal oxide, thus is exposed and is subsequently dissolved by the proper acid.

The step of potassium intercalation followed by reacting with ethanol causes more complete exfoliation of the intercalated layers, weakening the carbon shell structure covering the metallic particles. These structures are therefore more easily cracked by wet air oxidation, more completely exposing the metal catalyst. Each of these steps contributes to the purification, and the combination of potassium intercalation, wet air oxidation and hydrochloric acid treatments produces a high-purity SWNT containing purified sample. By using transmission electron microscopy, Raman spectrometry, x-ray diffractometry, and thermogravimetric analysis, we show that the methods of the present invention provide better yields and purities than another process involving a more established purification process involving a combination of refluxing in $HNO_3$, centrifugations, refluxing in $H_2O_2$ and wet oxidations in air at different temperatures (350 to 520° C.).

1.b Experimental

Figure 2:
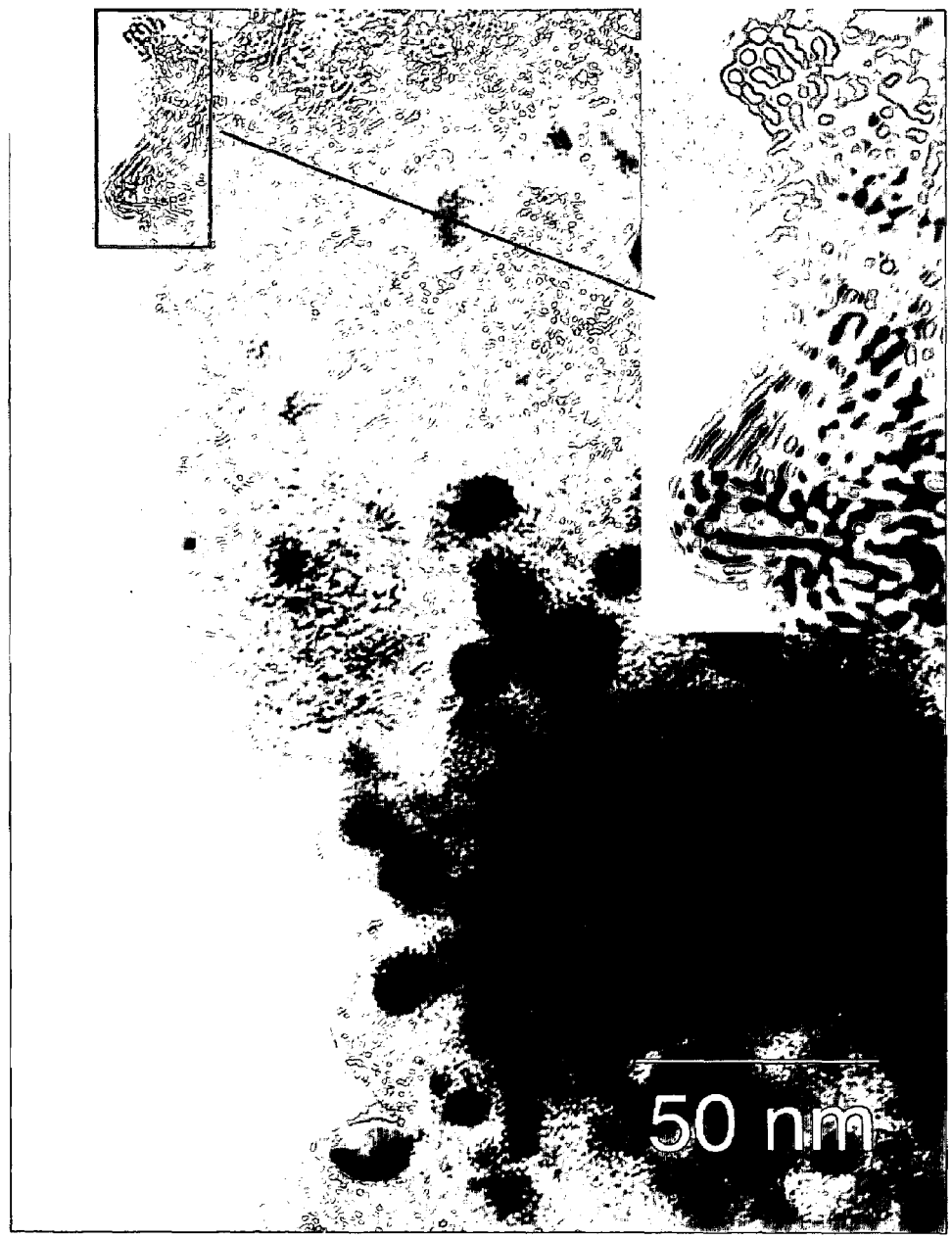
FIG. 2 shows a transmission electron microscope (TEM) image of the as-received sample containing SWNT that was purified using the present methods. The inset in FIG. 2 shows a region of the as-received material that comprises of the nanotube rope structure. The metal containing catalyst appears as darker, sphere shaped domains.

Single-wall carbon nanotube materials produced by the arc-discharge method with a Ni—Y catalyst (5 at. %) were obtained from Carbolex Inc. According to the manufacturer the as-received sample purity may vary from 70 to 90 vol. %, and it contains residual catalyst impurities. FIG. 2 shows a transmission electron microscope (TEM) image of the as-received sample containing SWNT that was purified using the present methods. The as-received Carbolex soot has a large volume of metal catalyst of various sizes, which appear as dark spheroids. X-ray microanalysis showed these particles to be composed of Ni and Y. Also seen are different types of carbon including: carbon shells, amorphous carbon, and free single-wall carbon nanotubes. The inset in FIG. 2 shows a region of the as-received material that comprises of the nanotube rope structure. Note the hexagonal packing of the tubes seen end-on at the top of the inset.

The as-received SWNT-containing sample was first evacuated and heated to 300° C. to remove any trace of moisture and $O_2$. Using an argon-filled glove box, samples were then loaded into a two-bulb reactor of the type used to synthesize graphitic potassium intercalation compounds. The carbon material and the potassium metal intercalant are put into each bulb of a glass reactor, evacuated, and then placed into a two-zone furnace. The potassium zone temperature was maintained at 250° C., whereas the nanotube zone temperature was adjusted to higher temperature to minimize the possibility that potassium metal might condense on the sample. The masses of potassium and carbon material were chosen to allow the formation of the most potassium-rich intercalation compound, $KC_8$. After reaction for two days, the potassium-doped nanotubes were reacted with ethanol until a neutral pH was obtained. The sample was then refluxed in concentrated hydrochloric acid (37%) for 24 hours: a typically green acid color was observed due to the dissolved $Ni^{2+}$. The materials were then subjected to a low temperature oxidation (350° C. during 24 hours) under flow of wet air, and again refluxed with HCl to further remove exposed catalyst particles. A final wet air oxidation at 450° C. with a shortened oxidation time of 2.5 hours was subsequently performed, followed by an HCl treatment. As a final step, to repair possible damage to the tube walls, the sample was annealed in nitrogen forming gas at 750° C. for 2 hours.

Thermogravimetric analysis (TGA), Raman spectroscopy, X-ray diffraction (XRD) and transmission electron microscopy (TEM) were used to evaluate the effectiveness of the purification treatments and to determine the relative purity of the SWNTs.

For TGA analysis, the nanotube samples were loaded into an alumina crucible, and a flow of argon was maintained at 40 mL/min while heating at 10° C./min from room temperature to 200° C. This temperature was held for 20 minutes under the argon flow and then for another 20 minutes under a 50:50 $Ar/O_2$ mixture. The chamber was then maintained under a continuous $Ar/O_2$ flow while the temperature was incrementally raised at 5° C./min to 700° C. or 1000° C. the time (t) dependence of the sample mass (m) was recorded.

To investigate possible SWNT damage from the steps of the purification process, Raman spectra were acquired at room temperature with a Renishaw Micro Raman spectrometer using a 514.5 nm argon ion laser with spectral resolution of 1 cm$^{-1}$. The samples were encapsulated in argon-filled glass ampoules, and to prevent the loss of potassium from the samples or other instabilities, Raman measurements were made with low laser power.

The crystallinity of the nanotube rope structure and the evolution of the impurity phases during purification were studied by x-ray diffractometry (XRD) and transmission electron microscopy (TEM). X-ray powder diffraction was performed with a Cu K$\alpha$ X-ray source (Philips PW3040, $\lambda$ Cu=1.54056 Å, 45 kV, 40 mA). Morphological observations of the as-received SWNTs were obtained by TEM measurements using a Philips EM420 operated at 100 kV.

1.c Results and Discussion 1.c.(i) Thermogravimetric Analysis

Figure 3A:
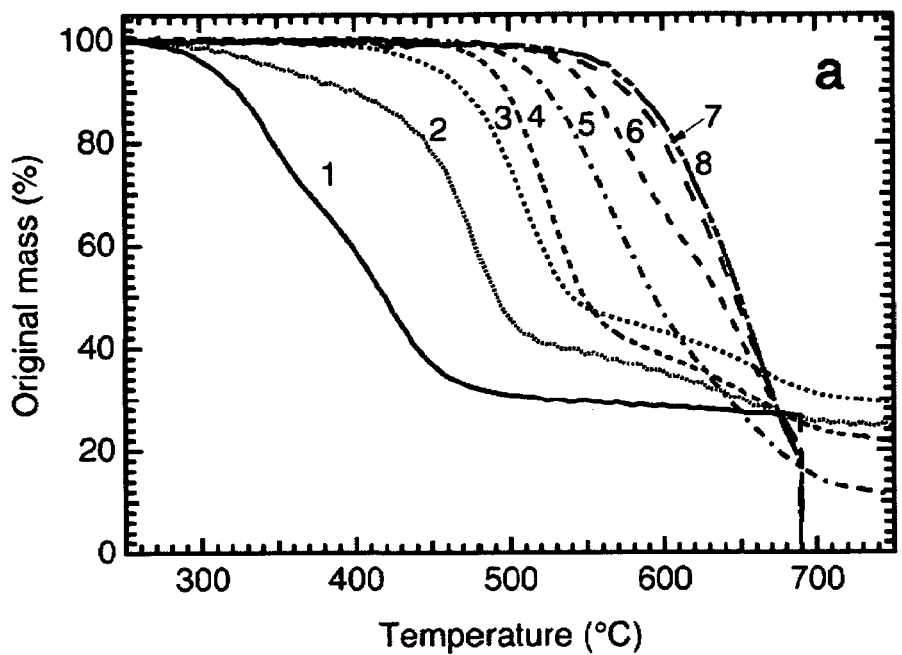
FIGS. 3A and 3B show TGA data recorded in an $Ar/O_2$ flow for the two studies of metal catalyst removal, where
Figure 3B:
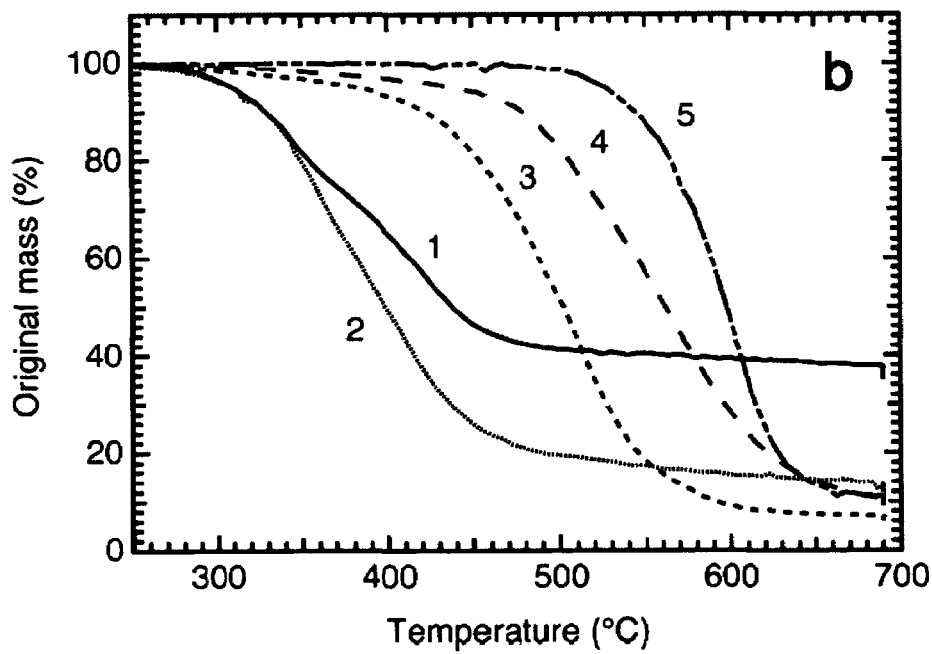

When heated in the presence of oxygen gas, carbon materials undergo oxidation, forming the gases CO or $CO_2$. Any material remaining after all of the carbon has been consumed is the initial metal catalyst in oxide form. FIGS. 3A and 3B show TGA data recorded in an Ar/$O_2$ flow for the two studies of metal catalyst removal, where FIG. 3A shows data for the conventional reflux purification methods [See, e.g. A. G. Rinzler, J. Liu, H. Dai, P. Nikolaev, C. B. Huffman, F. J. Rodriguez-Macias, P. J. Boul, A. H. Lu, D. Heymann, D. T. Colbert, R. S. Lee, J. E. Fischer, A. M. Rao, P. C. Eklund, R. E. Smalley, Appl. Phys. A 67, (1998) 29-37], and FIG. 3B shows data for the present methods using an initial potassium intercalation/exfoliation step. Each set of runs was performed with successive wet air oxidations at increasing temperatures, followed by an HCl reflux step after each oxidation.

For the data in FIG. 3A, a nitric acid reflux was performed on the as-received raw soot material, followed by an $H_2O_2$ reflux. The sample was subsequently oxidized at temperatures of 350, 425, 480, 510 and 520° C. Using a series of temperatures in this way is necessary because amorphous carbon and multi-shell carbon phases in the as-received soot cannot be removed selectively with a single oxidation step. The oxidation temperature range of amorphous carbon and multi-shell carbons (350° C. and 420° C. respectively) overlap with the oxidation range for SWNTs (400° C.). For the data in FIG. 3B, the SWNT material was reacted with potassium using a graphite intercalation procedure, and then reacted with ethanol (EtOH). The number of oxidation steps was reduced to two, performed at temperatures of 350° C. and 425° C.

For both sets of procedures, the samples underwent a final anneal at 750° C. under flowing forming gas consisting of nitrogen plus hydrogen. In comparing the TGA curves after the first step of purification for each method, FIGS. 3A and 3B shows that the potassium reaction followed by EtOH reacting is more effective as a first step in the purification process. The decomposition temperature shifts to a lower temperature, consistent with the formation of amorphous or turbostratic polyaromatic carbon phases by graphite exfoliation. More significantly, a subsequent mild treatment with HCl causes a larger mass loss after this intercalation step, because the carbon shells around the metal particles were more pervious to acid. In the second and third steps the oxidation processes were carried out at 350° C. and 425° C. respectively, and the samples were reacted again in HCl. With each reacting step, more metal is removed and the onset oxidation temperature is seen to increase. Such oxidation processes burn the carbon shell around the metal catalyst particles, exposing the metal particles to the acid. Because the nanotubes are more stable against oxidation than amorphous carbon, the nanotubes are not affected by oxidation at these temperatures. Starting from the second stage of purification, the TGA curves for both purification processes show the same behavior, but the potassium intercalation allows a smaller number of oxidation steps for the same amount of catalyst removal.

Yields were measured corresponding to the present purification process and the conventional process examined. The SWNT content remaining in the sample at the end of the present purification process involving potassium intercalation/exfoliation is about 18 wt. % whereas the total yield of carbon nanotubes for the more established purification process combining refluxing in nitric acid, refluxing in $H_2O_2$ and wet oxidations in air is less than a few weight percent.

1.c(ii) Micro Raman Spectroscopy

Figure 4:
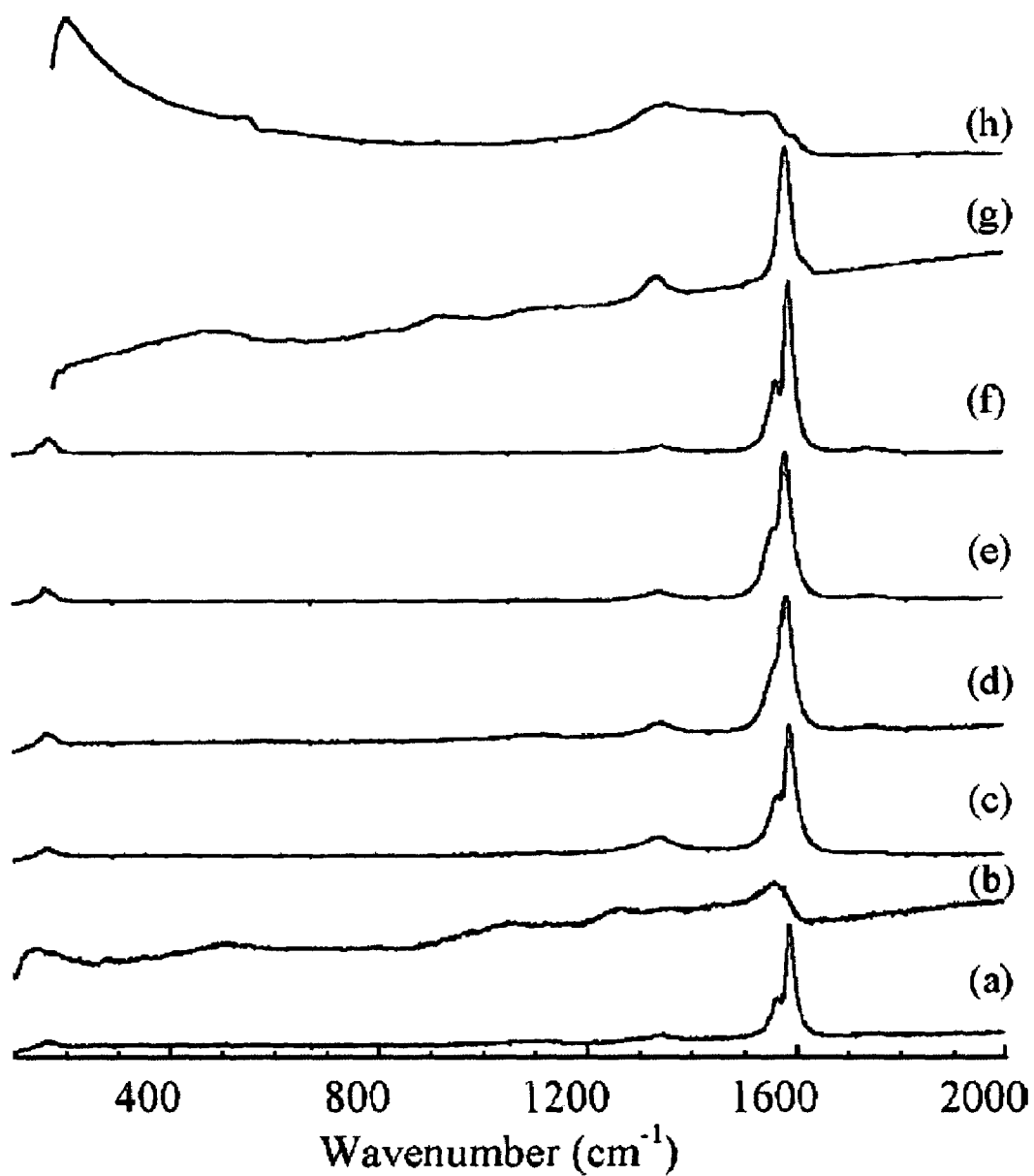
FIG. 4 provides Raman spectra of the sample after the different stages of purification using the present methods and provides reference spectra useful for interpreting the Raman spectra of the sample. The plots in FIG. 4 correspond to: (a) as-received Carbolex, (b) after doping with K, (c) after reacting with EtOH, (d) after HCl reflux, 350° C. wet oxidation and HCl reflux, (e) after 425° C. wet oxidation and HCl reflux (f) after $N_2/H_2$ forming gas treatment at 750° C., (g) graphite powder, (h) graphite powder after K intercalation ($KC_8$).

FIG. 4 compares the Raman spectra of the sample after the different stages of purification using the present methods. For comparison, typical Raman spectra of pure graphite are shown before, plot (g) in FIG. 4, and after potassium intercalation, plot (h) in FIG. 4. Graphite reacts with potassium to form graphite intercalation compounds $KC_n$. Intercalation compounds are distinguished by their staging, which is defined as the number of graphene layers separating the intercalated potassium layer. For example, the compound $KC_8$ is a stage 1 binary compound in which all van der Waals gaps between the graphene layers are occupied by potassium. In the spectrum of graphite, the sharp feature at 1584 cm$^{-1}$ is attributed to the $E_{2g}$ first order mode. The symmetry of the $E_{2g}$ mode restricts the motion of the atoms within the plane of the carbon atoms. An additional band at 1355 cm$^{-1}$ is attributed to finite size effects, resulting from smaller domains that are present among larger ones. This corresponds to a 'breathing mode' with $A_{1g}$ symmetry. A different Raman profile is observed for the potassium intercalated graphite compound. A broad asymmetric feature around 1500 cm$^{-1}$ is observed, characteristic of stage 1 $KC_8$.

The spectrum from as-received AP Carbolex material (plot (a) in FIG. 4) has two main bands at low (100-200 cm$^{-1}$) and high (1500-1600 cm$^{-1}$) frequencies, characteristic of SWNTs. The high-frequency bands can be decomposed into two main peaks at 1590 and 1570 cm$^{-1}$, which are associated with tangential modes related to C—C bond stretching motions. At low wave number, another characteristic tube mode is observed, where the carbon atoms are displaced radially outward in an in-phase, breathing mode. Superimposed on this spectrum is the contribution from amorphous sp$^2$ carbon, or possibly a thin coating on the nanotubes with a peak around 1350 cm$^{-1}$. Plot (b) in FIG. 4 shows the changes in the Raman spectrum after potassium doping, and has features similar to the spectrum from $KC_8$, plot (h) in FIG. 4. There are significant shifts in the frequencies of both radial and tangential modes, are evidence of the complete reaction of the nanotubes with potassium. After reacting in EtOH, clean SWNTs are recovered as shown by the spectrum of plot (c) in FIG. 4. Potassium intercalation followed by EtOH reacting leaves the nanotubes intact, while exfoliating the graphitic carbon coating that surrounds the metal catalyst particles. This is consistent with the increased intensity of Raman band from the turbostratic polyaromatic carbon at 1350 cm$^{-1}$. Further steps such as HCl reflux and wet air oxidation are then more efficacious in removing the catalyst than in removing disordered and graphitic sp$^2$ carbons. Evidence for this is noted by the presence of the residual line at 1350 cm$^{-1}$. However, the intensity of this peak does progressively diminish with processing. Raman spectra from the samples after wet air oxidation and subsequent HCl reflux and the last forming gas treatment (plots (d), (e) and (f) in FIG. 4, respectively) show the peaks characteristic of SWNTs. They are also consistent with at most minor nanotube damage during the purification.

1.c(iii) X-Ray Diffraction

Figure 5:
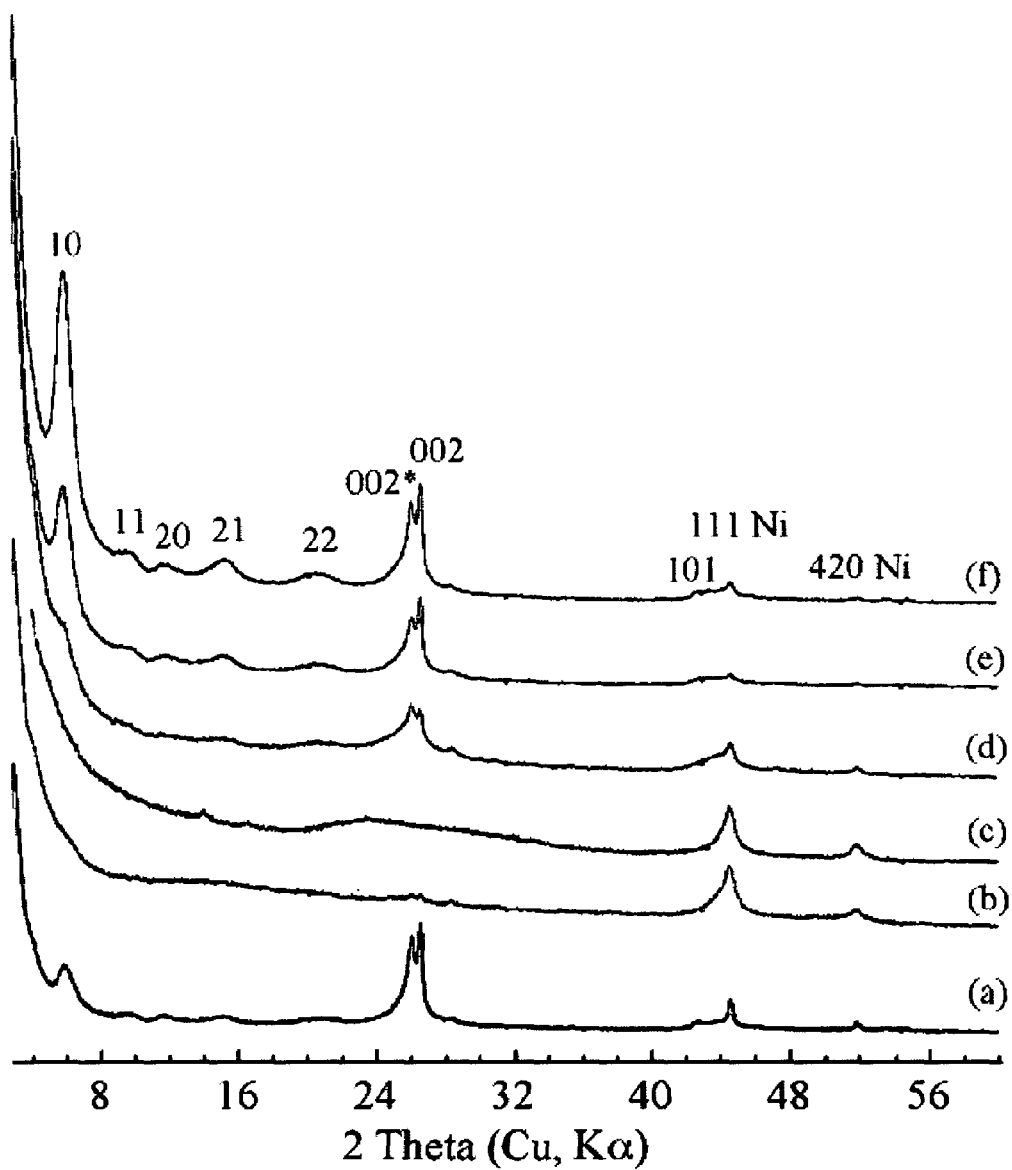
FIG. 5 presents X-ray diffraction (XRD) patterns from samples after different steps of purification using the present methods. The plots in FIG. 5 correspond to: (a) SWNT material purified with the $HNO_3$ process, (b) As-received Carbolex material, (c) after doping with K, (d) after reacting in EtOH, HCl reflux, wet oxidation at 350° C., HCl reflux, (e) after wet oxidation at 425° C., HCl reflux, (f) after annealing in $N_2/H_2$ forming gas at 750° C. The peak indexing is shown.

FIG. 5 presents X-ray diffraction (XRD) patterns from samples after different steps of purification using the present methods. The XRD pattern of the as-received material shown in plot (b) of FIG. 5 is dominated by the 111 and 200 diffraction peaks from fcc nickel at 44° and 52°, and includes a diffuse background attributed to synthesis byproducts such as amorphous carbon, which coexist with the SWNTs. After reaction with potassium, some metal particles remain and an increase in the intensity of the background is observed in plot (c) in FIG. 5. Precise quantitative details that delineate the effect of the alkali metal reaction are difficult to discern from the XRD data because of the inhomogeneity of this material and because of the nano-scale dimensions of the particles constituting the soot. Plot (d) in FIG. 5 shows that subsequent EtOH reacting, wet air oxidation at 350° C. and HCl reflux remove large amounts of catalyst, as evidenced by the change in relative peak height of the Ni diffractions with respect to remnant graphitic 002 diffraction peak. As a result of the exfoliation of the graphitic shell around the metal particles, the particles are more easily dissolved in acid. The first wet air oxidation at low temperature removes a large amount of amorphous carbon. This causes an increase in the graphitic particle diffraction peak-to-background, seen in the XRD profile as a doublet peak from turbostratic polyaromatic carbon ($d_{002*}$=340 nm) and graphite ($d_{002}$=335 nm). Plot (e) in FIG. 5, obtained after the second wet air oxidation at 425° C. followed by HCl reflux, shows well-defined diffractions from a hexagonal molecular crystal with a large unit cell, consistent with a close-packed rope structure of SWNTs. The forming gas treatment greatly improves the crystallinity of the rope packing as evidenced by the low-angle diffraction peaks in plot (f) of FIG. 5. The 2-dimensional nanotube-to-nanotube spacing is measured to be 1.712 nm. The X-ray diffraction pattern obtained after the first purification and followed by wet air oxidation at 510° C. shows diffraction peaks from the SWNT rope structure and a small 111 diffraction peak from the remaining catalyst. This observation again confirms the effectiveness of the purification process using potassium.

1.c(iv) TEM Images of Sample After Purification

Figure 6:
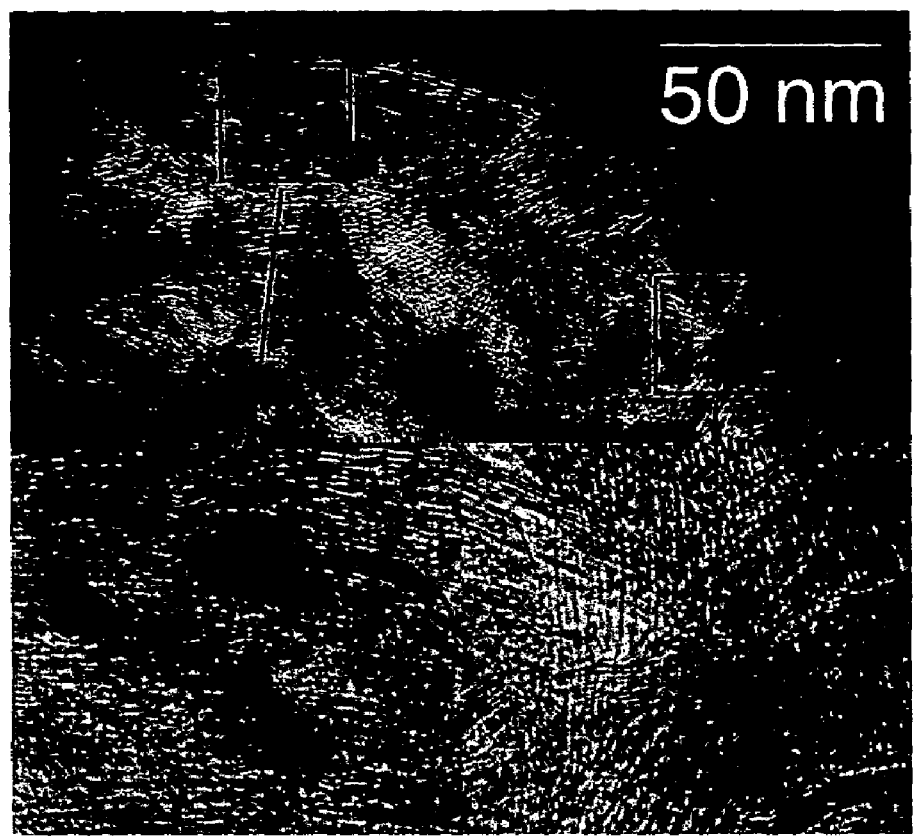
FIG. 6 provides transmission electron microscope (TEM) images of the SWNT-containing sample after purification by the present methods.

FIG. 6 provides transmission electron microscope (TEM) images of the SWNT-containing sample after purification by the present methods. These figures show that the present purification methods do not substantially degrade or damage the SWNTs in the sample undergoing processing, and indicate that the structure and composition of the purified SWNTs are similar to their structure and composition in the as-received sample. In addition, comparison of FIG. 6 and FIG. 2 indicates that the abundance of metal particles in the sample is significantly reduced after purification.

1.d Conclusion

The present methods are effective for purifying carbon single-wall nanotubes synthesized by the arc-discharge process. The processing step of potassium intercalation and subsequent reacting with EtOH exfoliates the graphite impurities, and exfoliates the graphitic shells around the metal catalyst particles. After intercalation, the metal catalyst particles are more susceptible to removal by subsequent wet oxidation treatments coupled with HCl reflux steps. It is demonstrated that purification methods using this intercalation step decreases the catalyst content to levels that are obtained by a conventional purification process, however, using fewer purification steps. Evidence for the efficacy of this potassium intercalation step was provided by TGA measurements and TEM observations. Raman spectroscopy indicated that the structural integrity of the nanotubes was not compromised by the various stages of purification. XRD showed good crystallinity of the material after purification.

EXAMPLE 2

Purification of Carbon Nanofibers Synthesized by Catalytic Methods

The present invention provides versatile methods for purifying a range of carbon materials in samples generated by catalytic synthesis techniques. The ability of methods of the present invention using potassium intercalation to purify carbon materials other than carbon nanotubes was experimentally verified by purifying samples containing carbon nanofibers generated by catalytic synthesis. The synthesis and characteristics of theses fibers has been reviewed by K. P. De Jong and J. W. Geus in Catalysis reviews-Science and Engineering, 42 (2000) pp 481-510. X-ray diffraction (XRD) is used to characterize the composition of the starting carbon fiber-containing sample and the composition of the sample after important processing steps of the present methods. The experimental results provided in this example illustrate that the present methods provide an effective, nondestructive pathway for purifying samples containing carbon nanofibers. Similar to the experimental results obtained for SWNTs (See e.g., Example 1), potassium intercalation followed by reacting in ethanol was observed to be particularly useful for enhancing the removal of residual metal catalyst particles by dissolution in an acid solution.

Carbon fiber materials subject to purification were vapor grown via catalytic growth techniques and, therefore, had a significant impurity comprising residual cobalt-iron catalyst particles having a composition of about 50 percent iron by mass and about 50 percent cobalt by mass. (see for example: M. Audier et al. in J. Crystal Growth 55(1981) 549-556) The starting carbon fiber-containing sample was first evacuated and heated to 300° C. to remove any trace of moisture and $O_2$. Using an argon-filled glove box, samples were then loaded into a two-bulb reactor of the type used to synthesize graphitic potassium intercalation compounds. The carbon material and the potassium metal intercalant are put into each bulb of a glass reactor, evacuated, and then placed into a two-zone furnace. The potassium zone temperature was maintained at 250° C., whereas the nanotube zone temperature was adjusted to higher temperature to minimize the possibility that potassium metal might condense on the sample. Intercalation of the carbon fiber-containing sample proceeded under these conditions for two days. After intercalation, the potassium-doped nanotubes were reacted with ethanol to initiate exfoliation. The sample was then refluxed in concentrated hydrochloric acid for 24 hours. The materials were then subjected to a low temperature oxidation (350° C. during 24 hours) under a flow of wet air, and again refluxed with HCl for 24 hours to further remove exposed catalyst particles. A final wet air oxidation at 450° C. with a shortened oxidation time of 2.5 hours was subsequently performed, followed by another treatment with concentrated HCl for 24 hours. As a final step, the sample was annealed in nitrogen-hydrogen forming gas at 750° C. for 2 hours to repair any damage to the carbon fibers and improve crystallinity.

2.a X-Ray Diffraction Results

Figure 7:
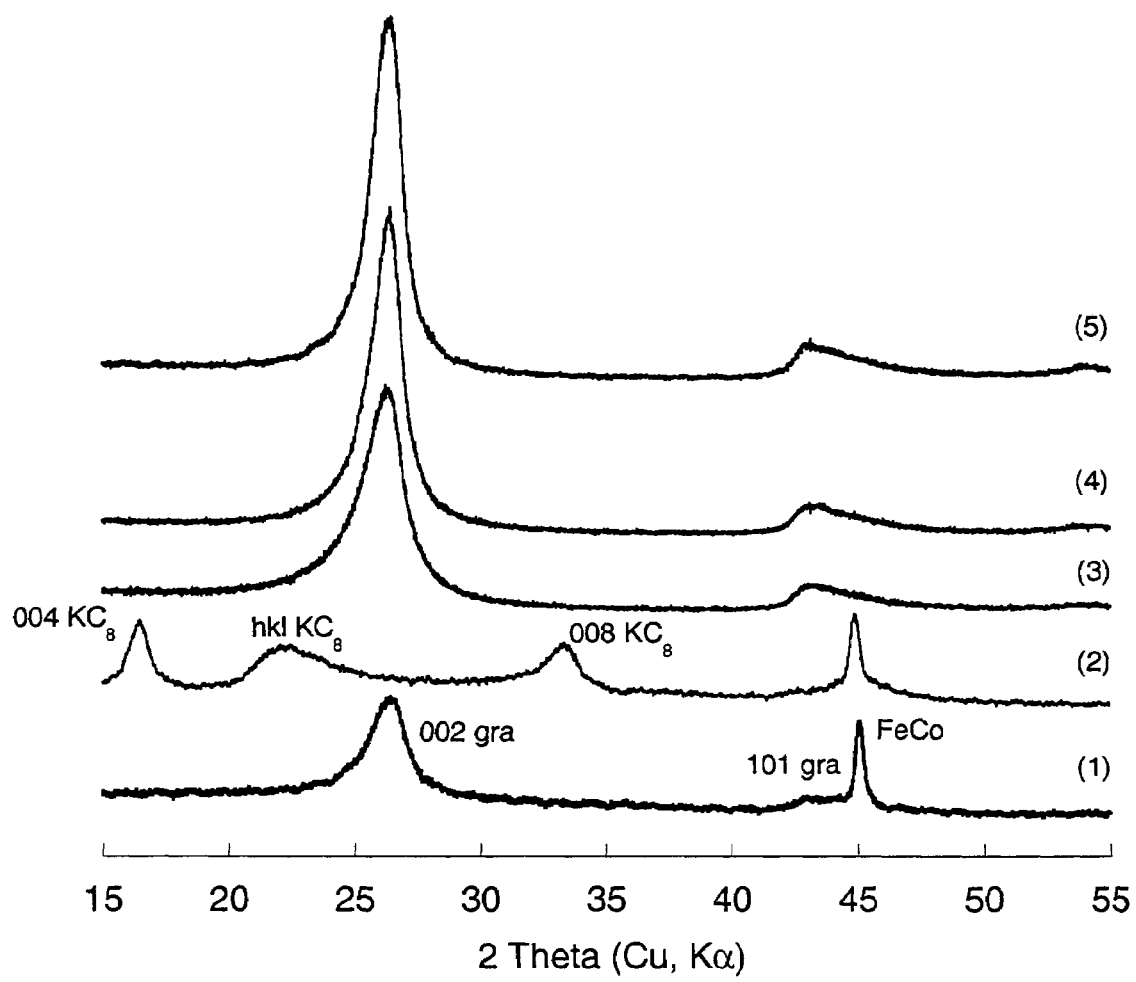
FIG. 7 provides X-ray diffraction (XRD) patterns of the starting carbon fiber-containing sample and the sample after different purification processing steps of the present invention.

FIG. 7 provides X-ray diffraction (XRD) patterns of the starting carbon fiber-containing sample and the sample after different purification processing steps of the present invention. The XRD pattern of the starting material provided in plot (1) of FIG. 7 indicates a peak at about 45 degrees corresponding to the cobalt-iron particles. Also shown in plot (1) of FIG. 7 are the 002 and 101 graphite peaks at about 26 degrees and 44 degrees, respectively, which correspond to graphite layers comprising the carbon fibers. Plot (2) of FIG. 7 shows the diffraction pattern observed after intercalation with potassium. The cobalt-iron peak at about 45 degrees is clearly observable in plot (2). The 002 and 101 graphite peaks at 26 degrees and 44 degrees, however, are entirely missing and replaced with a series of peaks at about 16 degrees, about 23 degrees and about 34 degrees. These peaks corresponding to the 004 (at ≈16 degrees), hkl (at ≈23 degrees) and 008 (at ≈34 degrees) peaks of intercalated graphite having a stoichiometry of one potassium to eight carbons (i.e. $KC_8$). Plot (3) provides the XRD pattern observed after reacting the intercalated sample with ethanol and refluxing with concentrated HCl for 24 hours. The cobalt-iron peak at about 45 degrees is not present in the diffraction pattern provided in plot (3), which indicates this series of process steps effectively removes most of the metal catalyst particles. The reemergence of 002 and 101 graphite peaks at 26 degrees and 44 degrees may be attributed to the presence of unintercalated carbon fibers and indicates that the carbon fibers in the sample are not lost or significantly damaged during this processing step. The similarity of the shape and position of 002 and 101 graphite peaks in plots (1) and (3) of FIG. 7 indicates that the composition and structure of the fibers after the reacting with ethanol and HCl reflux processing step is similar to the composition of the carbon fibers in the as-received sample. Plot (4) of FIG. 7 provides the diffraction pattern obtained after wet oxidation for 24 hours at 350 degrees Celsius and refluxing with concentrated HCl for 24 hours. Similar to plot (3), plot (4) of FIG. 7 shows that the carbon fibers are maintained in the sample during this processing step. Plot (5) of FIG. 7, provides the diffraction pattern obtained after wet oxidation for 24 hours at 450 degrees Celsius, refluxing with concentrated HCl for 24 hours and annealing at 750 degrees in a nitrogen-hydrogen forming gas for two hours. Comparison of plots (3), (4) and (5) of FIG. 7 indicate that further sample processing via wet oxidation at successively higher temperatures and annealing improves the crystallinity of the purified carbon fibers.

The experimental results provided in this example demonstrate the applicability of the present methods for purifying carbon fibers materials generated by catalytic synthesis. The processing step of potassium intercalation and subsequent reacting with ethanol exfoliates carbonaceous impurities that form shells around residual metal catalyst particles. After intercalation, the residual metal catalyst particles are more susceptible to removal by subsequent wet oxidation treatments coupled with HCl reflux steps. XRD patterns obtained before, during and after sample processing, indicate the present methods provide an effective pathway for removing metal catalyst impurities and that the present methods provide a source of purified carbon fibers exhibiting good crystallinity.

2.b TEM Images of Sample Before and After Purification

Figure 8:
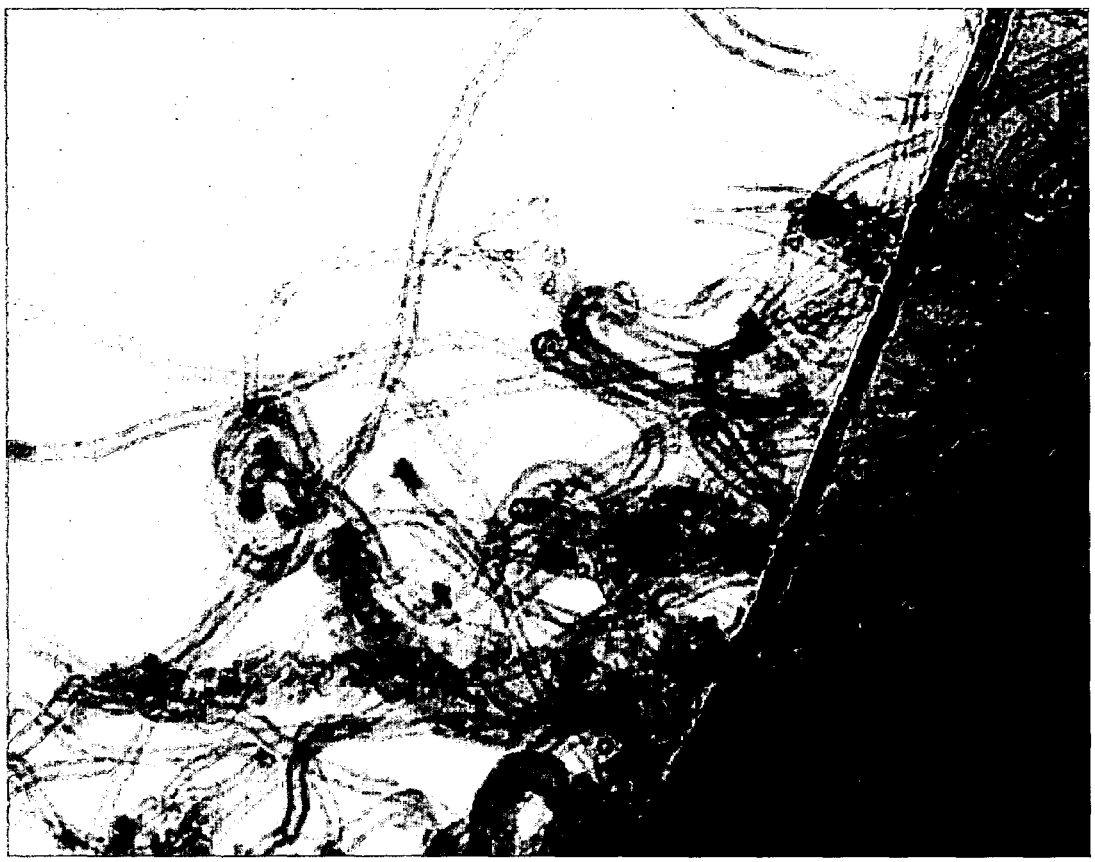
FIG. 8 shows a transmission electron microscope (TEM) image of the as-received sample containing carbon fibers that was purified using the present methods.

FIG. 8 shows a transmission electron microscope (TEM) image of the as-received sample containing carbon fibers that was purified using the present methods. As shown in FIG. 8, the as-received sample has a significant component comprising cobalt-iron catalyst particles, which appear as dark spheroids. Also seen are different types of carbon including: carbon shells, amorphous carbon, and carbon fibers.

Figure 9A:
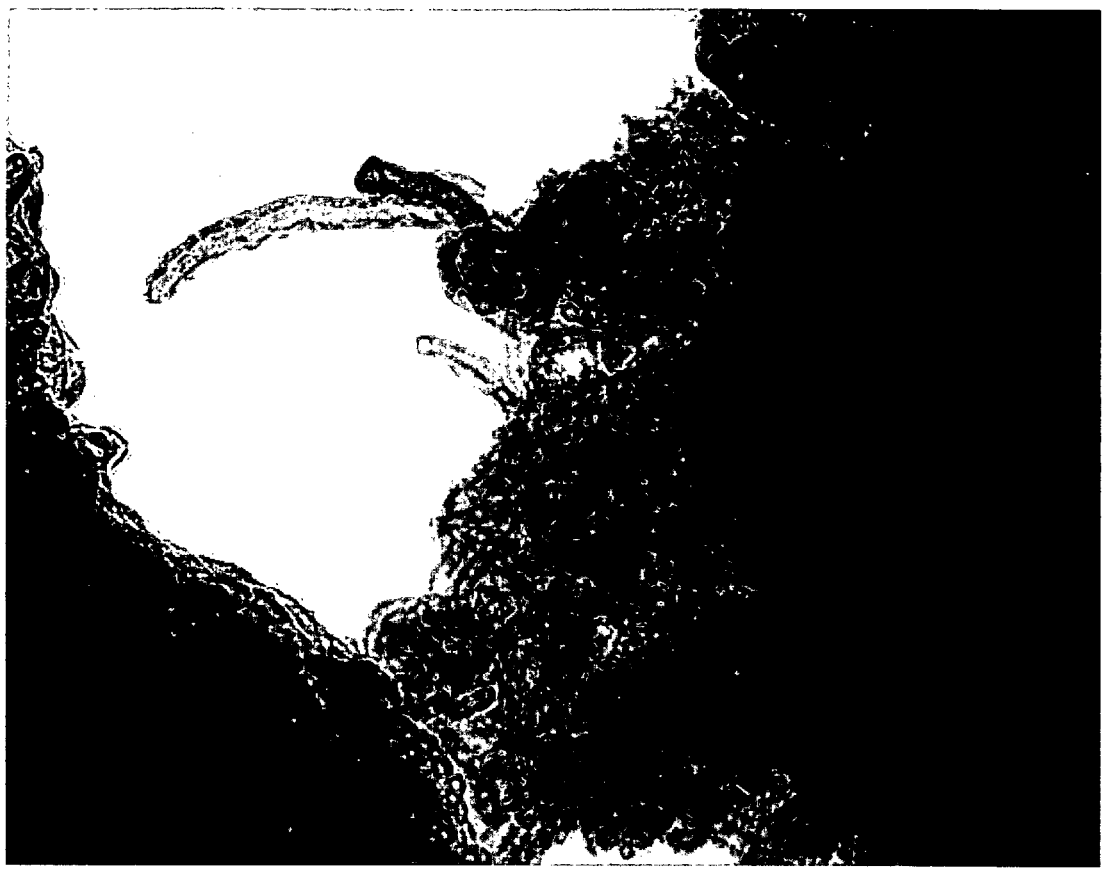
FIGS. 9A, 9B and 9C provide TEM images of the carbon fiber-containing sample after purification by the present methods.
Figure 9B:
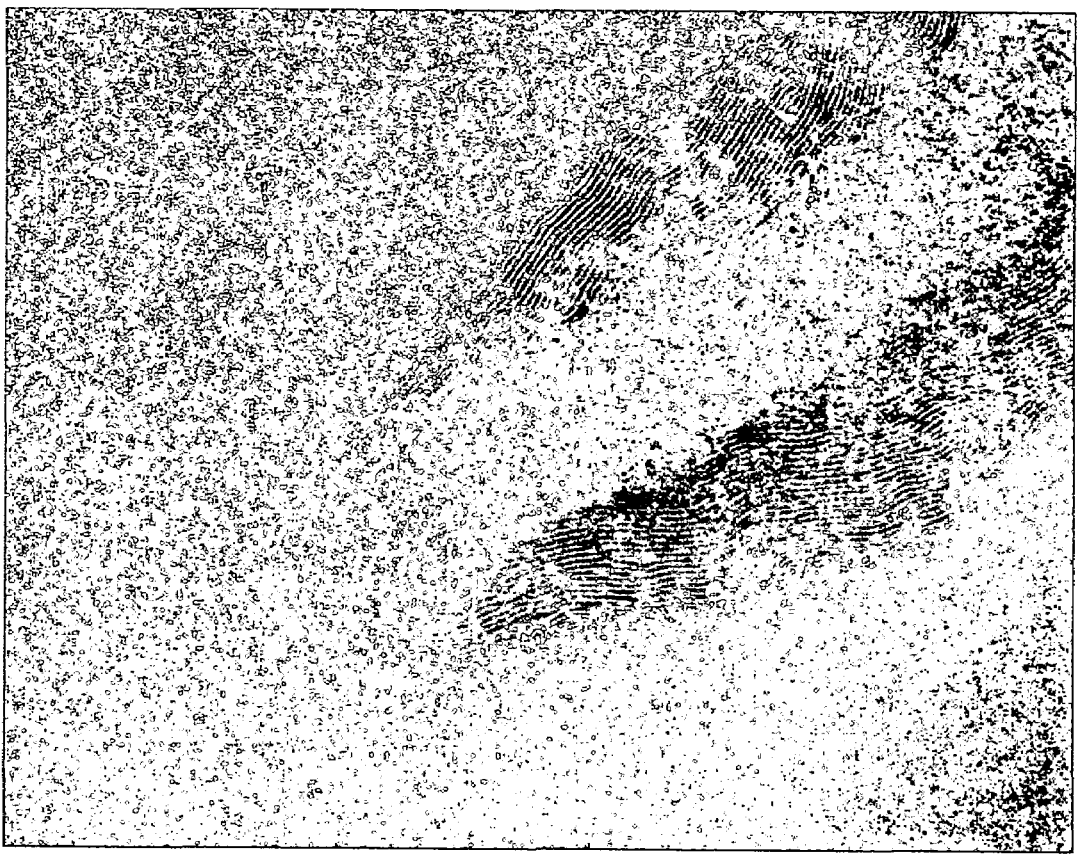
Figure 9C:

FIGS. 9A, 9B and 9C provide TEM images of the carbon fiber-containing sample after purification by the present methods. FIG. 9A is a lower resolution image than the images shown in FIGS. 9B and 9C. These figures show that the present purification methods do not substantially degrade or damage the carbon fibers in the sample undergoing processing, and indicate that the structure and composition of the purified carbon fibers are similar to their structure and composition in the as-received sample. In addition, comparison of FIGS. 9A, 9B and 9C and FIG. 8 indicates that the abundance of metal particles in the sample is significantly reduced after purification by the present methods.

We claim:

1. A method of purifying a sample containing a carbon material having a selected structure said method comprising the steps of:
   providing said sample containing said carbon material having said selected structure and impurities comprising carbonaceous impurities, wherein said carbonaceous impurities comprise one or more carbon layers having a structure different than that of said selected structure;
   exfoliating at least a portion of the carbon layers of said carbonaceous impurities, thereby generating exfoliated carbonaceous material; and
   removing said impurities, thereby purifying said sample containing said carbon material having said selected structure,
   wherein said step of exfoliating comprises adding an intercalant to said sample, wherein said intercalant inserts into interstitial sites in between multiple carbon layers comprising said carbonaceous impurities, interstitial sites between the carbon layers comprising said carbonaceous impurities and said carbon material having said selected structure, or both, thereby generating intercalated carbon layers, and wherein said intercalant is electrochemically intercalated into said carbon layers by application of an electric potential or electric current to said sample.

2. A method of purifying a sample containing a carbon material having a selected structure said method comprising the steps of:
   providing said sample containing said carbon material having said selected structure and impurities comprising carbonaceous impurities, wherein said carbonaceous impurities comprise one or more carbon layers having a structure different than that of said selected structure;
   exfoliating at least a portion of the carbon layers of said carbonaceous impurities, thereby generating exfoliated carbonaceous material; and
   removing said impurities, thereby purifying said sample containing said carbon material having said selected structure,
   wherein said step of exfoliating comprises: adding an intercalant to said sample, wherein said intercalant inserts into interstitial sites in between multiple carbon layers comprising said carbonaceous impurities, interstitial sites between the carbon layers comprising said carbonaceous impurities and said carbon material having said selected structure, or both, thereby generating intercalated carbon layers; and adding an exfoliation initiator which reacts with said intercalant in said intercalated carbon layers.

3. The method of claim 2 wherein said intercalant in said intercalated carbon layers and said exfoliation initiator undergo an exothermic reaction.

4. The method of claim 2 wherein said intercalant in said intercalated carbon layers and said exfoliation initiator undergo a reaction generating a gas phase product.

5. The method of claim 2 wherein said intercalant is potassium and said exfoliation initiator is ethanol.

6. The method of claim 5 further comprising the step of reacting said intercalated carbon layers with ethanol.

7. A method of purifying a sample containing a carbon material having a selected structure said method comprising the steps of:
providing said sample containing said carbon material having said selected structure and impurities comprising carbonaceous impurities, wherein said carbonaceous impurities comprise one or more carbon layers having a structure different than that of said selected structure;
exfoliating at least a portion of the carbon layers of said carbonaceous impurities, thereby generating exfoliated carbonaceous material; and
removing said impurities, thereby purifying said sample containing said carbon material having said selected structure,
wherein said carbon material having said selected structure is a carbon film; and said impurities are selected from the group consisting of:
graphene layers;
graphite;
amorphous carbon; and
metal particles.

8. A method of purifying a sample containing a carbon material having a selected structure said method comprising the steps of:
providing said sample containing said carbon material having said selected structure and impurities comprising carbonaceous impurities, wherein said carbonaceous impurities comprise one or more carbon layers having a structure different than that of said selected structure;
exfoliating at least a portion of the carbon layers of said carbonaceous impurities, thereby generating exfoliated carbonaceous material; and
removing said impurities, thereby purifying said sample containing said carbon material having said selected structure; and
annealing said sample after removing said impurities, wherein the temperature of said sample is raised to a temperature selected from the range of about 650 degrees Celsius to about 850 degrees Celsius during annealing.

9. A method of exfoliating at least a portion of a plurality of carbon layers at least partially enclosing metal particles in a sample generated in the synthesis of carbon nanotubes; said method comprising the steps of:
providing said sample generated in the synthesis of carbon nanotubes containing carbon nanotubes and said metal particles, wherein each metal particle is at least partially enclosed by said carbon layers;
adding an intercalant to said sample, wherein said intercalant inserts between at least a portion of said carbon layers, thereby generating intercalated carbon layers; and
adding an exfoliation initiator to said sample which reacts with intercalant present between said carbon layers, thereby exfoliating at least a portion of said carbon layers at least partially enclosing said metal particles.

10. The method of claim 9 wherein said intercalant is potassium and said exfoliation initiator is ethanol.

11. The method of claim 9 wherein said intercalant in said intercalated carbon layers and said exfoliation initiator undergo an exothermic reaction.

12. The method of claim 9 wherein said sample is prepared using a synthesis technique selected from the group consisting of:
arc-discharge methods;
chemical vapor deposition methods;
tube furnace methods;
pyrolytic methods;
electrochemical methods; and
laser ablation methods.

13. A method of removing carbonaceous coatings from the outer surfaces of carbon nanotubes; said method comprising the steps of:
providing a sample comprising said carbon nanotubes, wherein at least a portion of the outer surfaces of said nanotubes are partially or completely coated with said carbonaceous coatings, and wherein said carbonaceous coatings have a structure different from that of said nanotubes;
adding an intercalant to said sample, wherein said intercalant inserts into interstitial sites between said nanotubes and said carbonaceous coating, thereby generating intercalated carbon layers; and
adding an exfoliation initiator to said sample which reacts with intercalant in said intercalated carbon layers, wherein the reaction between said intercalant present between said carbon nanotubes and said carbonaceous coating and said exfoliation initiator exfoliates said carbonaceous coating, thereby removing said carbonaceous coatings from the outer surfaces of said carbon nanotubes.

14. The method of claim 13 wherein said intercalant is potassium and said exfoliation initiator is ethanol.

15. The method of claim 13 wherein said intercalant in said intercalated carbon layers and said exfoliation initiator undergo an exothermic reaction.

16. The method of claim 13 wherein said sample is prepared using a synthesis technique selected from the group consisting of:
arc-discharge methods;
chemical vapor deposition methods;
tube furnace methods;
pyrolytic methods;
electrochemical methods; and
laser ablation methods.

17. A method of purifying a sample containing single walled carbon nanotubes, said method comprising the steps of:
providing said sample containing said single walled nanotubes and impurities comprising metal particles, wherein said metal particles are at least partially enclosed by a plurality of carbon layers having a structure different from that of said single walled carbon nanotubes;
adding an intercalant to said sample, wherein said intercalant inserts between at least a portion of said carbon layers enclosing said metal particles, thereby generating intercalated carbon layers; and
adding an exfoliation initiator which reacts with intercalant in said intercalated carbon layers, thereby exfoliating at least a portion of said carbon layers and exposing the surface of said metal particles; and refluxing said sample in concentrated hydrochloric acid, thereby dissolving said metal particles and purifying said sample containing said single walled carbon nanotubes.

18. The method of claim 17 wherein said intercalant is potassium and said exfoliation initiator is ethanol, and wherein potassium present between said carbon layers and ethanol undergo an exothermic reaction generating a gas phase product.

19. The method of claim 17 comprising the step of reacting said intercalated carbon layers with ethanol.

20. A method of purifying a sample containing carbon fibers, said method comprising the steps of:

providing said sample containing said carbon fibers and impurities comprising metal particles, wherein said metal particles are at least partially enclosed by a plurality of carbon layers;

adding an intercalant to said sample, wherein said intercalant inserts between at least a portion of said carbon layers enclosing said metal particles, thereby generating intercalated carbon layers enclosing said metal particles; and adding an exfoliation initiator which reacts with intercalant in said intercalated carbon layers enclosing said metal particles, thereby exfoliating at least a portion of said carbon layers and exposing the surface of said metal particles; and refluxing said sample in concentrated hydrochloric acid, thereby dissolving said metal particles and purifying said sample containing carbon fibers.

21. The method of claim 20 wherein said carbon fibers are catalytically grown carbon nanofibers.

22. The method of claim 20 wherein said intercalant is potassium and said exfoliation initiator is ethanol, and wherein potassium present between said carbon layers and ethanol undergo an exothermic reaction generating a gas phase product.

23. The method of claim 20 comprising the step of reacting said intercalated carbon layers with ethanol.

* * * * *